US010551834B2

(12) United States Patent
Lee et al.

(10) Patent No.: US 10,551,834 B2
(45) Date of Patent: Feb. 4, 2020

(54) METHOD AND ELECTRONIC DEVICE FOR CONTROLLING UNMANNED AERIAL VEHICLE

(71) Applicant: Samsung Electronics Co., Ltd., Gyeonggi-do (KR)

(72) Inventors: Wu-Seong Lee, Sejong-si (KR); Tae-Kyun Kim, Gyeonggi-do (KR); Jung-Jae Lee, Gyeongsangbuk-do (KR); Seung-Nyun Kim, Incheon (KR); Yong-Sang Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 101 days.

(21) Appl. No.: 15/854,232

(22) Filed: Dec. 26, 2017

(65) Prior Publication Data
US 2018/0181119 A1   Jun. 28, 2018

(30) Foreign Application Priority Data

Dec. 26, 2016   (KR) .................. 10-2016-0179255

(51) Int. Cl.
| | |
|---|---|
| *G05D 1/03* | (2006.01) |
| *G05D 1/02* | (2006.01) |
| *B64C 39/02* | (2006.01) |
| *G05D 1/00* | (2006.01) |

(52) U.S. Cl.
CPC ......... *G05D 1/0038* (2013.01); *B64C 39/024* (2013.01); *G05D 1/0202* (2013.01); *B64C 2201/146* (2013.01)

(58) Field of Classification Search
CPC ............ B64C 2201/146; B64C 39/024; G05D 1/0038; G05D 1/0202
See application file for complete search history.

(56) References Cited

U.S. PATENT DOCUMENTS

| | | | |
|---|---|---|---|
| 8,903,568 B1 | 12/2014 | Wang et al. | |
| 8,958,928 B2 | 2/2015 | Seydoux et al. | |
| 9,880,551 B2* | 1/2018 | Lacaze | G05D 1/0016 |
| 9,963,230 B2* | 5/2018 | Borman | A47L 5/12 |

(Continued)

FOREIGN PATENT DOCUMENTS

EP   2 177 966   4/2010

OTHER PUBLICATIONS

International Search Report dated Mar. 26, 2018 issued in counterpart application No. PCT/KR2017/015378, 12 pages.

*Primary Examiner* — Tyler J Lee
(74) *Attorney, Agent, or Firm* — The Farrell Law Firm, P.C.

(57) ABSTRACT

An electronic device is disclosed and includes a display, a wireless communication circuit configured to transmit or receive data, a processor, and a memory electrically connected with the processor. The memory stores instructions, which when executed, enable the processor to display a first video portion corresponding to a reference heading direction of an unmanned aerial vehicle (UAV) of a video captured by the UAV, display a second video portion corresponding to a virtual heading direction of the video in response to a first input, and in response to a second input, generate a first control signal to cause the UAV to move with respect to the virtual heading direction, and transmit the generated first control signal through the wireless communication circuit to the UAV.

18 Claims, 36 Drawing Sheets

(56) References Cited

U.S. PATENT DOCUMENTS

| | | | |
|---|---|---|---|
| 2005/0186884 A1* | 8/2005 | Evans | A63H 17/14 |
| | | | 446/456 |
| 2012/0280087 A1 | 11/2012 | Coffman et al. | |
| 2014/0008496 A1 | 1/2014 | Ye et al. | |
| 2016/0194079 A1 | 7/2016 | Montreuil | |
| 2016/0306351 A1 | 10/2016 | Fisher et al. | |
| 2016/0379414 A1* | 12/2016 | Brown | G06F 3/04842 |
| | | | 345/633 |
| 2017/0041587 A1* | 2/2017 | Wei | B64C 39/024 |
| 2018/0035606 A1* | 2/2018 | Burdoucci | A01D 34/008 |
| 2018/0143627 A1* | 5/2018 | Lee | B64C 39/024 |
| 2018/0150073 A1* | 5/2018 | Lee | B64D 45/00 |
| 2018/0246529 A1* | 8/2018 | Hu | G05D 1/0202 |

* cited by examiner

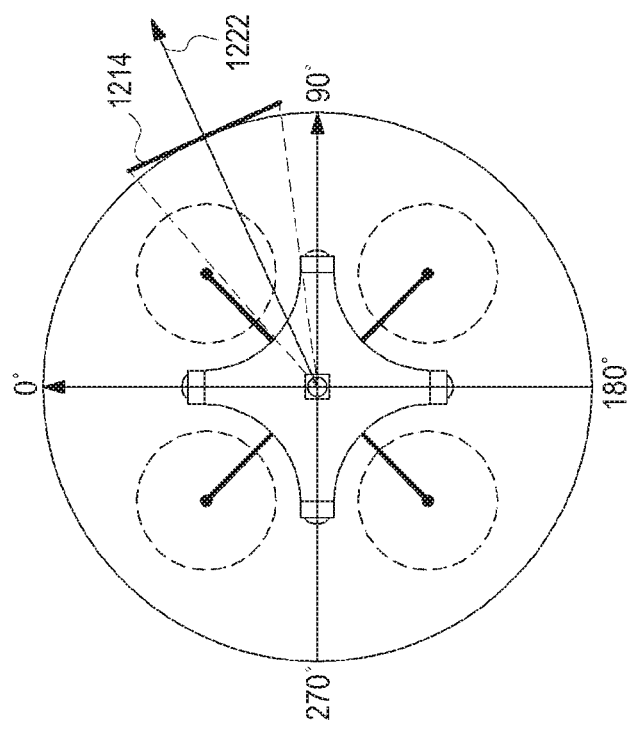
FIG.12B
FIG.12C
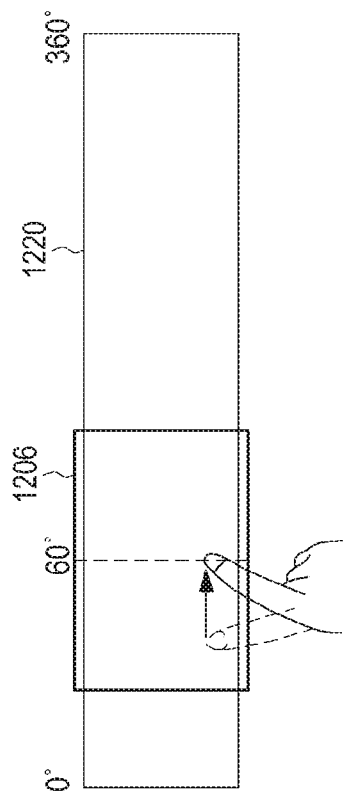
FIG.12A

METHOD AND ELECTRONIC DEVICE FOR CONTROLLING UNMANNED AERIAL VEHICLE

PRIORITY

This application claims priority under 35 U.S.C. § 119(a) to Korean Patent Application Serial No. 10-2016-0179255, which was filed in the Korean Intellectual Property Office on Dec. 26, 2016, the entire content of which is incorporated herein by reference.

BACKGROUND

1. Field of the Disclosure

The present disclosure relates generally to unmanned aerial vehicles and methods for controlling the same.

2. Description of the Related Art

An unmanned aerial vehicle (UAV) may capture pictures or videos while being wirelessly controlled. UAVs may be airplanes, helicopters, or other aircraft that may fly via radio waves without a human pilot aboard. While UAVs were first created for military applications, their use is expanding to other applications, including product deliveries and aerial photography.

A UAV for omni-directional photography may capture images in all directions and stream the captured images to a controller. The controller may then choose a particular object or composition in real-time to control the UAV.

When a UAV omni-directionally captures images of an object, it is difficult to identify the angle at which the object is positioned with respect to the direction that the UAV is heading. In this case, the conventional method which controls the vehicle while rotating the fixed direction that the vehicle heads would not be effective.

SUMMARY

In accordance with an aspect of the present disclosure, an electronic device is provided. The electronic device includes a housing; a display integrated with the housing; a wireless communication circuit configured to establish wireless communication with an unmanned aerial vehicle (UAV) including an omni-directional camera; at least one sensor disposed in the housing and configured to detect an orientation of the display; a processor disposed in the housing and electrically connected with the display, the wireless communication circuit, and the at least one sensor; and a memory disposed in the housing and electrically connected with the processor. The memory stores instructions executed to enable the processor to receive video data captured by the omni-directional camera of the UAV through the wireless communication circuit while the UAV faces in a first direction, display a video on the display based on at least part of the video data, receive an input to select an area or object on the video positioned in a second direction different from the first direction, transmit a control signal configured to indicate the second direction and to fly the UAV without rotation in the second direction through the wireless communication circuit to the UAV in response to the input, and receive the video data captured by the omni-directional camera of the UAV through the wireless communication circuit from the UAV while the UAV faces in the second direction.

In accordance with an aspect of the present disclosure, an electronic device is provided. The electronic device includes a display; a wireless communication circuit configured to transmit or receive data; a processor; and a memory electrically connected with the processor. The memory stores instructions executed to enable the processor to display a first video portion corresponding to a reference heading direction of an unmanned aerial vehicle (UAV) of a video captured by the UAV, display a second video portion corresponding to a virtual heading direction of the video in response to a first input, and generate a first control signal, in response to a second input, to move the UAV with respect to the virtual heading direction, and transmit the generated first control signal through the wireless communication circuit to the UAV.

In accordance with an aspect of the present disclosure, a storage medium is provided. The storage medium stores commands, the commands configured to be executed by at least one processor to enable the at least one processor to perform at least one operation, the at least one operation includes displaying a first video portion corresponding to a reference heading direction of an unmanned aerial vehicle (UAV) of a video captured by the UAV; displaying a second video portion corresponding to a virtual heading direction of the video in response to a first input; and generating a first control signal, in response to a second input, to move the UAV with respect to the virtual heading direction, and transmitting the generated first control signal to the UAV.

In accordance with an aspect of the present disclosure, a UAV is provided. The UAV includes, a housing; an omni-directional camera integrated in the housing; a wireless communication circuit configured to establish wireless communication with a controller; a plurality of propellers; a navigation circuit configured to drive the propellers; a processor disposed in the housing and electrically connected with the omni-directional camera, the wireless communication circuit, and the navigation circuit; and a memory disposed in the housing and electrically connected with the processor. The memory stores instructions executed to enable the processor to establish wireless communication with the controller using the wireless communication circuit, transmit video data captured by the omni-directional camera through the wireless communication circuit to the controller while the UAV faces in a first direction, receive a control signal indicating a second direction different from the first direction through the wireless communication circuit, control the navigation circuit to fly the UAV without rotation in the second direction, and transmit the video data captured by the omni-directional camera through the wireless communication circuit to the controller while the UAV faces in the second direction.

In accordance with an aspect of the present disclosure, a UAV is provided. The UAV includes, a camera module; a wireless communication circuit configured to transceive data; a plurality of propellers; a processor; and a memory electrically connected with the processor. The memory stores instructions executed to enable the processor to transmit a video captured by the UAV to a controller, receive a first control signal from the controller, convert the first control signal into a control signal to move the UAV with respect to a virtual heading direction, and move the UAV according to the converted control signal.

In accordance with an aspect of the present disclosure, a storage medium is provided. The storage medium stores commands, the commands configured to be executed by at least one processor to enable the at least one processor to perform at least one operation, the at least one operation including transmitting a video captured by a unmanned aerial vehicle (UAV) to a controller; receiving a first control signal from the controller; converting the first control signal into a control signal to move the UAV with respect to a virtual heading direction; and moving the UAV according to the converted control signal.

BRIEF DESCRIPTION OF THE DRAWINGS

The above and other aspects, features, and advantages of the present disclosure will be more apparent from the following detailed description taken in conjunction with the accompanying drawings, in which:

FIGS. 12A, 12B, 12C, 13A, 13B, 14A, and 14B illustrate a method for controlling a UAV according to an embodiment of the present disclosure;

DETAILED DESCRIPTION

Figure 1:
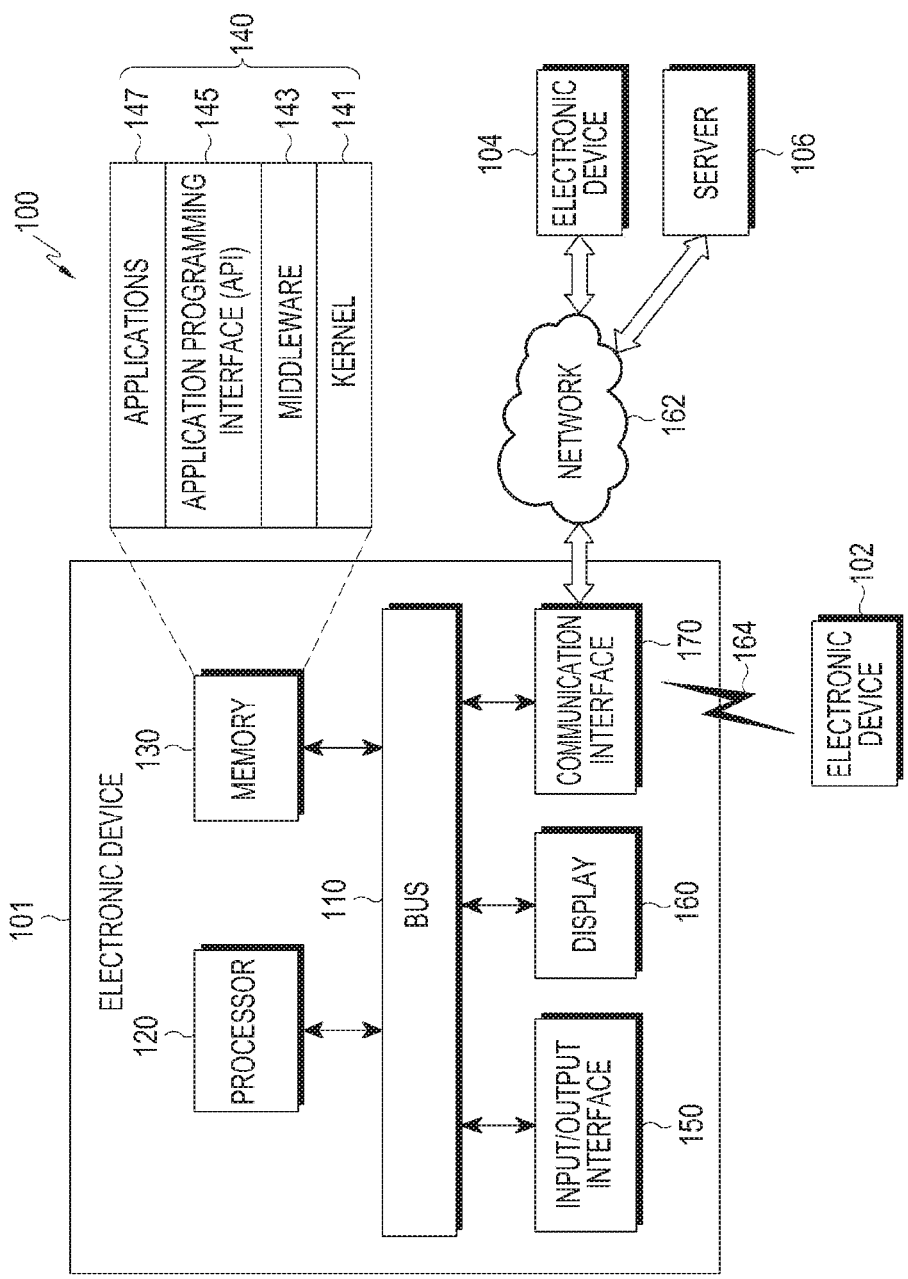
FIG. 1 illustrates a network environment including an electronic device according to an embodiment of the present disclosure.

It should be appreciated that the present disclosure is not limited to the embodiments and the terminology used herein, and all changes and/or equivalents or replacements thereto also belong to the scope of the present disclosure. The same or similar reference numerals may be used to refer to the same or similar elements throughout the specification and the drawings. It is to be understood that the singular forms "a", "an", and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order, and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element. As used herein, the term "configured to" may be interchangeably used with other terms, such as "suitable for", "capable of", "modified to", "made to", "adapted to", "able to", or "designed to" in hardware or software depending on the context. The term "configured to" may mean that a device can perform an operation together with another device or components. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

An electronic device according to various embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. The smart home appliance may include at least one of a television, a digital versatile disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (e.g., Xbox™ and PlayStation™), an electronic dictionary, an electronic key, a camcorder, or an electronic picture frame.

According to an embodiment of the present disclosure, the electronic device may include at least one of various medical devices (e.g., diverse portable medical measuring devices (e.g., a blood sugar level measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, a security devices, vehicular head units, industrial or home robots, drones, an automatic teller machine (ATM), a point of sales (POS) device, or an Internet of things (IoT) device (e.g., a light bulb, various sensors, a sprinkler, a fire alarm, a thermostat, a street light, a toaster, fitness equipment, a hot water tank, a heater, or a boiler).

According to various embodiments of the present disclosure, the electronic device may be at least one of part of a piece of furniture, building/structure or vehicle, an electronic board, an electronic signature receiving device, a projector, or various measurement devices (e.g., devices for measuring water, electricity, gas, or electromagnetic waves). The electronic device may be flexible or may be a combination of the above-mentioned electronic devices. The electronic device is not limited to the above-mentioned embodiments. As used herein, the term "user" may denote a human or another device (e.g., an artificial intelligence electronic device) using the electronic device.

FIG. 1 illustrates a network environment including an electronic device according to an embodiment of the present disclosure.

Referring to FIG. 1, according to an embodiment of the present disclosure, an electronic device 101 (e.g., a controller) is included in a network environment 100. The electronic device 101 may include a bus 110, a processor 120, a memory 130, an input/output interface 150, a display 160, and a communication interface 170 (e.g., a wired and/or wireless communication circuit). The electronic device 101 may exclude at least one of the components or may add another component. The bus 110 may include a circuit for connecting the components 120 to 170 with one another component and transferring communications (e.g., control messages or data) between the components. The processor 120 may include one or more of a CPU, an AP, or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or applications 147. At least a portion of the kernel 141, middleware 143, or API 145 may be referred to as an operating system (OS). For example, the kernel 141 may control or manage system resources (e.g., the bus 110, processor 120, or a memory 130) used to perform operations or functions implemented in other programs (e.g., the middleware 143, API 145, or applications 147). The kernel 141 may provide an interface that allows the middleware 143, the API 145, or the applications 147 to access the individual components of the electronic device 101 to control or manage the system resources.

The middleware 143 may function as a relay to allow the API 145 or the applications 147 to communicate data with the kernel 141. Further, the middleware 143 may process one or more task requests received from the applications 147 in order of priority. For example, the middleware 143 may assign a priority of using system resources (e.g., bus 110, processor 120, or memory 130) of the electronic device 101 to at least one of the applications 147, and process one or more task requests. The API 145 is an interface allowing the applications 147 to control functions provided from the kernel 141 or the middleware 143. For example, the API 133 may include at least one interface or function (e.g., a command) for file control, window control, image processing, or text control. For example, the input/output interface 150 may transfer commands or data input from the user or another external device to other component(s) of the electronic device 101, or may output commands or data received from other component(s) of the electronic device 101 to the user or other external devices.

The display 160 may include, e.g., a liquid crystal display (LCD), a light emitting diode (LED) display, an organic light emitting diode (OLED) display, a microelectromechanical systems (MEMS) display, or an electronic paper display. The display 160 may display, e.g., various content (e.g., text, images, videos, icons, or symbols) to the user. The display 160 may include a touchscreen and may receive, e.g., a touch, a gesture, a proximity, or hovering input using an electronic pen or the user's body part. The communication interface 170 may set up communication between the electronic device 101 and an external electronic device (e.g., a first electronic device 102, a second electronic device 104, or a server 106). The communication interface 170 may be connected with the network 162 through wireless or wired communication to communicate with the external electronic device.

The wireless communication 164 may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), Bluetooth™, Bluetooth low power (BLE), zigbee, near field communication (NFC), magnetic secure transmission (MST), radio frequency, or body area network (BAN). The wireless communication may include global navigation satellite system (GNSS). The GNSS may be, e.g., global positioning system (GPS), global navigation satellite system (Glonass), Beidou navigation satellite system (Beidou) or, Galileo which is the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS-232), power line communication (PLC), or plain old telephone service (POTS). The network 162 may include at least one of telecommunication networks, e.g., a computer network (e.g., local area network (LAN) or wide area network (WAN)), the Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104, or server 106). When the electronic device 101 should perform some function or service automatically or at a request, the electronic device 101, instead of executing the function or service on its own or additionally, may request another device to perform at least some functions associated therewith. The other electronic device may execute the requested functions or perform additional functions, and transfer a result of the execution to the electronic device 101. The electronic device 101 may provide a requested function or service by processing the received result as it is or perform additional processing. To that end, cloud computing, distributed computing, or client-server computing technique may be used, for example.

Figure 2:
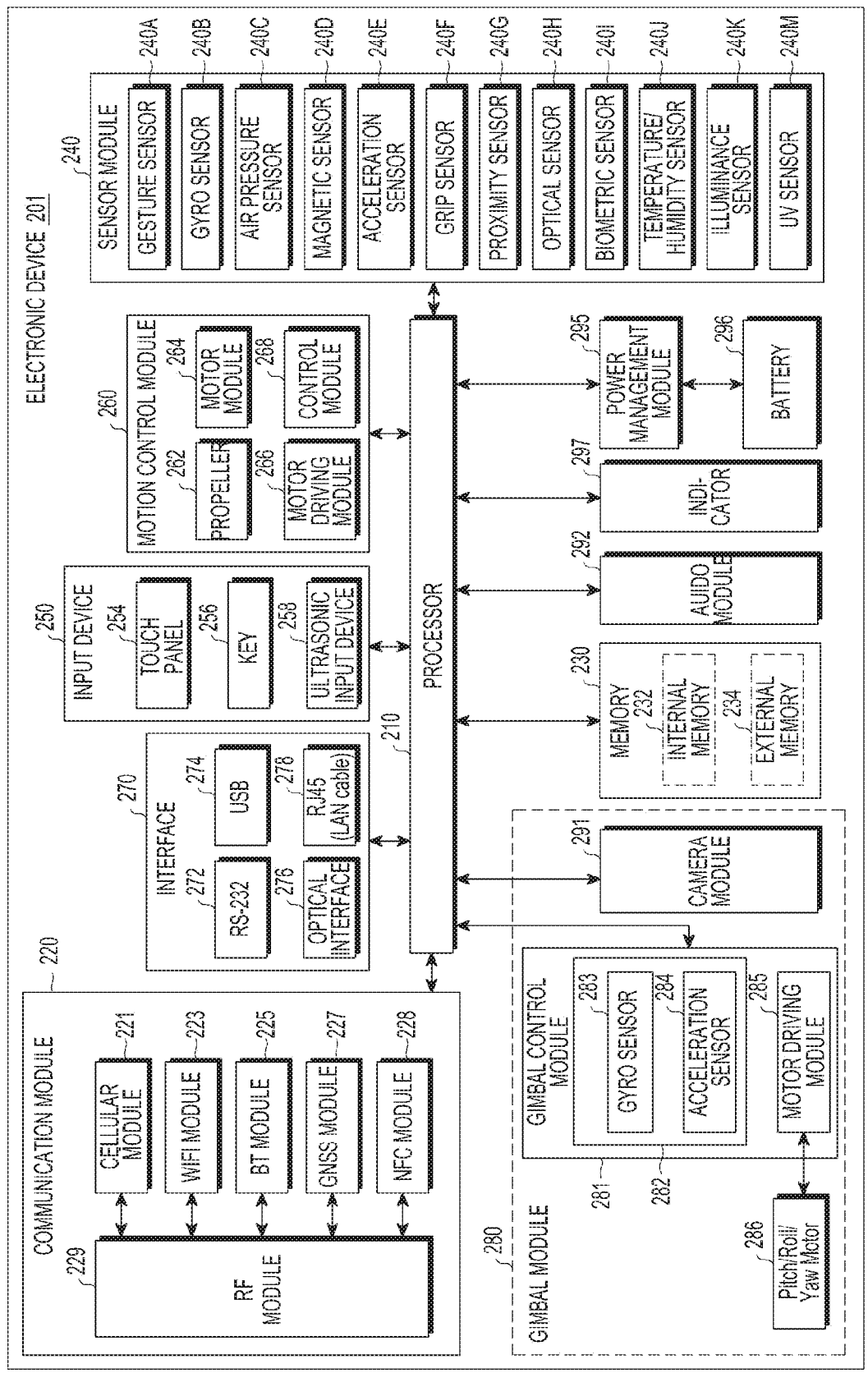
FIG. 2 is a block diagram illustrating an electronic device according to an embodiment of the present disclosure.

FIG. 2 is a block diagram illustrating an electronic device according to an embodiment of the present disclosure.

Referring to FIG. 2, the electronic device 201 (e.g., a UAV) may further include one or more processors 210, a communication module 220 (e.g., a wired and/or wireless communication circuit), an interface 270, an input device 250, a sensor module 240, a memory 230, an audio module 292, an indicator 297, a power management module 295, a battery 296, a camera module 291, and a motion control module 260. The electronic device 201 may further include a gimbal module 280.

The processor 210 may control multiple hardware and software components connected to the processor 210 by running, e.g., an OS or application programs, and the processor 210 may process and compute various data. The processor 210 may drive an OS or an application program to generate a flight command for the electronic device 201. For example, the processor 210 may generate a motion control signal or motion command using data received from the camera module 291, the sensor module 240, or the communication module 220.

The processor 210 may generate a motion control signal by calculating a relative distance to an object. The processor 210 may generate an altitude control signal for the electronic device 201 based on a vertical coordinate (or a vertical azimuth) of the object, and a horizontal and direction (or azimuth) control signal based on horizontal coordinate (or a horizontal azimuth) of the object.

The communication module 220 may include, e.g., a cellular module 221, a wireless fidelity (Wi-Fi) module 223, a Bluetooth (BT) module 225, a GNSS module 227, a NFC module 228, and a radio frequency (RF) module 229. According to an embodiment of the present disclosure, the communication module 220 may receive control signals for the electronic device 201 and transmit state information about the electronic device 201 and image data to other electronic devices. The RF module 229 may transmit and receive communication signals (e.g., RF signals). The RF module 229 may include at least one of, e.g., a transceiver, a power amp module (PAM), a frequency filter, a low noise amplifier (LNA), or an antenna.

The GNSS module 227 may output location information indicating at least one of the latitude, longitude, altitude, speed, and heading information about the electronic device 201. The location of the electronic device 201, or the location information about the electronic device 201, may be computed by measuring an exact time and distance through the GNSS module 227. The GNSS module 227 may obtain an exact time and 3D speed information, as well as the location with the latitude, longitude, and altitude. According to an embodiment of the present disclosure, the electronic device 201 may transmit information for identifying the real-time movement of the electronic device 201 through the communication module 220 to another electronic device.

The interface 270 is a device for data input/output with another electronic device. For example, the input/output interface 270 may transfer commands or data input from another external electronic device to other component(s) of the electronic device 201, or may output commands or data received from other component(s) of the electronic device 201 to the user or other external electronic device, using a universal serial bus (USB) 274, an optical interface 276, RS-232 272, or RJ45 278 interface.

The input device 250 may include, e.g., a touch panel 254, a key 256, or an ultrasonic input device 258. The touch panel 254 may use at least one of capacitive, resistive, infrared (IR), or ultrasonic methods. According to an embodiment of the present disclosure, the touch panel 254 may include a pressure sensor (or pose sensor) that may measure the strength of a pressure by the user's touch. The pressure sensor may be implemented in a single body with the touch panel 254 or may be implemented in one or more sensors separate from the touch panel 254. The touch panel 254 may further include a control circuit. The key 256 may include e.g., a physical button, optical key or keypad. The ultrasonic input device 258 may sense an ultrasonic wave generated from an input tool through a microphone to identify data corresponding to the sensed ultrasonic wave. Control inputs for the electronic device 201 may be received through the input device. For example, when a physical power key is pressed, the electronic device 201 may power off.

The sensor module 240 may include all or some of a gesture sensor 240A capable of detecting the motion and/or gesture of an object, a gyro sensor 240B capable of measuring the angular speed of the electronic device 201 while flying, an air pressure sensor (e.g., a barometer) 240C capable of measuring the atmospheric pressure and/or a variation in the atmospheric pressure, a magnetic sensor 240D capable of measuring the terrestrial magnetism, an acceleration sensor 240E capable of measuring the acceleration of the electronic device while flying, a grip sensor 240F capable of determining where the user is gripping the electronic device 201, a proximity sensor 240G capable of measuring the proximity or distance of an object (including an ultrasonic sensor capable of outputting an ultrasound wave and obtaining a reflection of the ultrasound wave on an object to thereby measure the distance), an optical sensor 240H (e.g., an optical flow sensor (OFS) capable of recognizing the topography or pattern of a floor to produce the location, a biometric sensor 240I for user authentication, a temperature/humidity sensor 240J capable of measuring the temperature and humidity, an illuminance sensor 240K capable of measuring illuminance, and an ultraviolet (UV) sensor 240M capable of measuring the intensity of UV rays. According to an embodiment of the present disclosure, the sensor module 240 may calculate the posture of the electronic device 201. The posture information about the electronic device 201 may be shared with the motion control module 260.

The memory 230 may include an internal memory 232 and an external memory 234. The memory 230 may store commands or data related to at least one other component of the electronic device 201. The memory 230 may store software and/or a program. The program may include, e.g., a kernel, middleware, an API, and/or applications).

The audio module 292 may convert, e.g., a sound signal into an electrical signal and vice versa. The audio module 292 may include a speaker and a microphone to process sound input or output.

The indicator 297 may indicate a particular state of the electronic device 201 or a part (e.g., the processor) of the electronic device, including, e.g., an operation state or recharging state. The indicator 297 may also indicate the state of flight and operation mode.

The power manager module 295 may manage power of the electronic device 201. According to an embodiment of the present disclosure, the power manager module 295 may include a power management integrated circuit (PMIC), a charger IC, or a battery gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery, a voltage, a current, or a temperature while the battery is being charged.

The battery 296 may include, e.g., a rechargeable battery or a solar battery.

The communication module 220 may be included in the electronic device 201 or in a gimbal module 280. The camera module 291 may include a lens, an image sensor, an image signal processor (ISP), and a camera controller. The camera controller may adjust the upper, lower, left, and right angles of the camera lens based on composition information and/or camera control information output from the processor 210, and adjust the composition and/or camera angle (e.g., image capturing angle) with respect to the object. The image sensor may include, e.g., a low level driver, a pixel array, and a column driver. The ISP may include, e.g., a pre-image processing unit, a post-image processing unit, a still image codec, and a video codec. The ISP may be included in the processor. The camera controller may control, e.g., focusing and tracking.

The camera module 291 may perform an image capturing operation in an image capturing mode. The camera module 291 may be influenced by the motion of the electronic device 201. The camera module 291 may be embedded in the gimbal module 280 to minimize image capturing variations in the camera module 291 due to the motion of the electronic device 201.

The motion control module 260 may control the posture and motion of the electronic device 201 using posture and position information about the electronic device 201. The motion control module 260 may control, e.g., the roll, pitch, yaw, and throttle (or altitude) of the electronic device 201 according to the position and posture information obtained. The motion control module 260 may control the hovering flight operation and the free flight operation based on a free flight control signal provided from the processor 210 and the flight operation according to a user input command received (e.g., a distance movement, altitude movement, horizontal, and direction (or azimuth) control signal). For example, where the electronic device 201 is a quadcopter, the motion control module 260 may include a plurality of control modules 268 (e.g., microprocessor units (MPUs)), a motor driving module 266, a motor module 264, and a propeller 262. The control module 268, the motor driving module 266, and the motor module 264 (or the motion control module 260 except for the propeller 262) may be denoted as a driving circuit or navigation circuit configured to drive the propeller 262. The control module 260 may output control data to rotate the propeller 262 corresponding to the flight operation control. The motor driving module 266 may convert motor control data corresponding to the output of the control module 268 into a driving signal and output the driving signal. The motor module 264 may control the rotation of the corresponding propeller 262 based on a driving signal of the corresponding motor driving module 266.

The gimbal module 280 may include, e.g., a gimbal control module 281, a sensor 282, a motor driving module 285, and a motor 286. At least part of the camera module 291 may be included in the gimbal module 280.

The gimbal module 280 may generate compensation data according to the motion of the electronic device 201. The compensation data may be data for controlling at least part of the pitch, roll, or yaw of the camera module 291. For example, the motor 286 (or a pitch motor, roller motor, and yaw motor) may compensate for the pitch, roll, and yaw of the camera module 291 according to the movement of the electronic device 201. The camera module 291 may be mounted in the gimbal module 280 to cancel off the movement by the rotation (e.g., pitch rotation, roll rotation, and yaw rotation) of the electronic device 201 (e.g., a multi-copter), therefore stabilizing the camera module 291 in a steady position. The gimbal module 280 may enable the camera module 291 to remain at a predetermined slope regardless of the motion of the electronic device 201, therefore allowing for stable image capturing. The gimbal control module 281 may include a sensor 282 including a gyro sensor 283 and an acceleration sensor 284. The gimbal control module 281 may analyze a measurement obtained by the sensor 282 including a gyro sensor 283 and an acceleration sensor 284, generating a control signal through the motor driving module 285 and driving the motor 286 of the gimbal module 280.

Figure 3:
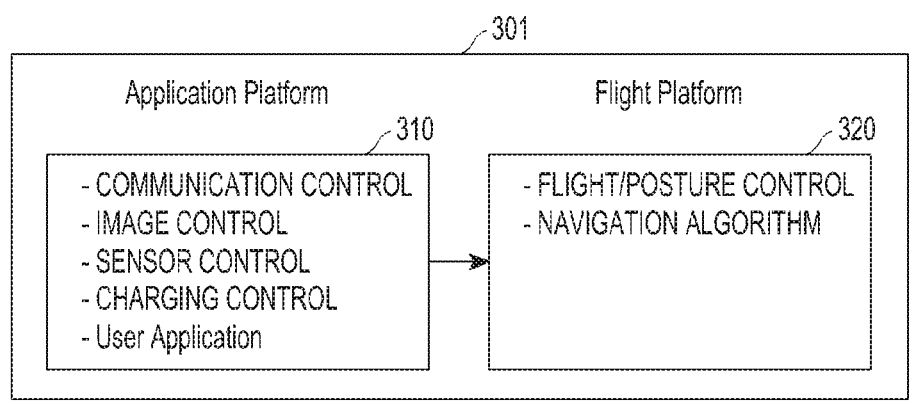
FIG. 3 is a block diagram illustrating a programming module according to an embodiment of the present disclosure.

FIG. 3 is a block diagram illustrating a programming module according to an embodiment of the present disclosure.

The program module 301 of the electronic device 201 may include an application platform 310 and a flight platform 320. The electronic device may include at least one or more of the application platform 310 for receiving a control signal from another electronic device (e.g., the controller) wirelessly in interoperation to drive the electronic device and to provide a service or the flight platform 320 for controlling the flight as per a navigation algorithm.

The application platform 310 may perform at least one of, e.g., connectivity control, image control, sensor control, or charging control of the components of the electronic device, and varying the operation as per the user application. The application platform 310 may be executed on a processor 210. The flight platform 320 may execute the flight, posture control, and navigation algorithm of the electronic device. The flight platform 320 may be executed on the processor or a motion control module 260.

The application platform 310 may deliver a control signal to the flight platform 320 while performing at least one of communication, image, sensor, and charging controls.

According to an embodiment of the present disclosure, the processor may obtain an image of an object through a camera module 291. The processor may analyze the obtained image and generate a control signal (e.g., command) for controlling the flight of the electronic device. For example, the processor may generate size information and motion state of the obtained object, and information about the relative distance, altitude, and azimuth between the image capturing device and the object. The processor may generate a flight tracking (e.g., follow me mode) control signal of the electronic device using the generated information. The flight platform 320 may control the motion control module 260 based on the received control signal, to control the flight of the electronic device (e.g., controlling the posture and motion of the electronic device).

According to an embodiment of the present disclosure, a GPS module (e.g., the GNSS module 227) and a sensor module 240 may measure at least one of, e.g., the position, flight posture, posture angular speed, and acceleration of the electronic device. The information output from the GPS module and the sensor module may become basic information about the control signal for navigation/automated control of the electronic device. Information obtained from an air pressure sensor capable of measuring the altitude by a difference in atmospheric pressure from the flight of the electronic device and ultrasonic sensors capable of accurate measurement at a lower altitude may also be utilized as the basic information. Besides, a control signal received from a remote controller, a control data signal, and battery status information about the electronic device may also be utilized as the basic information about the control signal.

The electronic device may fly using, e.g., multiple propellers 262. Each propeller may convert a rotational force from the motor module 264 into a propelling force. Depending on the number of rotors (or the number of propellers), the electronic device may be referred to as a quadcopter when it has four rotors or propellers, a hexacopter when it has six rotors or propellers, or an octocopter when it has eight rotors or propellers.

The electronic device 201 may control the propellers based on the received control signals. The electronic device 201 may fly based on the two principles of lift and torque. The electronic device 201 may rotate half of the multiple propellers clockwise (CW) and the other half counter-clockwise (CCW). The 3D coordinates of the flight of the electronic device 201 may be determined as pitch (Y)/roll (X)/yaw (Z). The electronic device may fly tilted up, down, right, and left. Tilting the electronic device 201 may change the direction of the air flow generated by the propellers (or rotors). For example, when the electronic device 201 tilts forward, the air may be rendered to flow above and below the electronic device and slightly pushed away to the back. Thus, as the air layer is pushed to the back, the electronic device 201 may advance according to the law of action and reaction. The electronic device 201 may be tilted by reducing the speed of the front while increasing the speed of the back. Such methods may apply for every direction. Thus, simply adjusting the speed of the motor module 264 (or rotors) may allow the electronic device 201 to tilt and move.

The flight platform 320 may receive a control signal generated by the application platform 310 to control the motor module 264, thereby controlling the pitch (Y)/roll (X)/yaw (Z) or posture of the electronic device 201 and the flight path of the electronic device 201.

Figure 4:
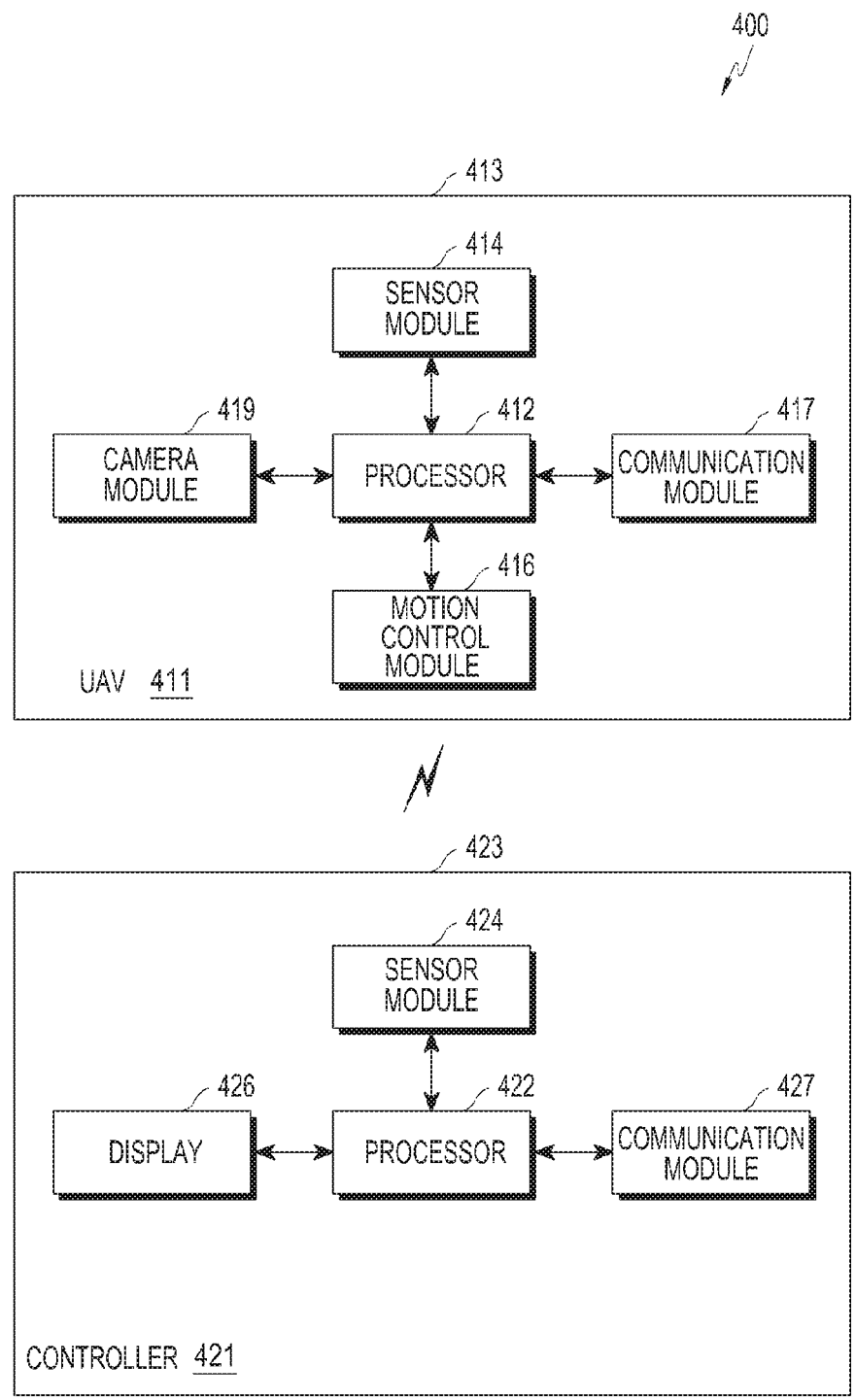
FIG. 4 is a block diagram illustrating an image capturing system according to an embodiment of the present disclosure.

FIG. 4 is a block diagram illustrating an image capturing system according to an embodiment of the present disclosure.

An image capturing system 400 may include a UAV 411 (e.g., the electronic device 201) including a camera module 419 for image capturing and a controller 421 including a display 426, such as a virtual reality (VR) device, smailphone, or tablet PC.

The UAV 411 may stream an omni-directional image and/or video captured to the controller 421 which may include a display 426 and analyze a control signal from the controller 421 to control a motor module 264 through a control module 268, thereby controlling the UAV 411.

The display-equipped controller 421 may display the omni-directional image and/or video received from the UAV 411 and control the motion of the UAV 411.

According to an embodiment of the present disclosure, the controller 421 may analyze the motion of the head/gaze of the user, if it is a VR device, and the display area, if it is a normal display, to obtain a virtual heading direction of the UAV 411, and the controller 421 may transmit the virtual heading direction to the UAV 411 in real time. The UAV 411 may set the heading in the virtual heading direction, analyze a control signal from the controller 421, and move.

The UAV 411 may include a camera module 419 to capture and output images or videos, a motion control module 416 to control the motion or movement of the UAV 411, a communication module 417 for transmitting data to the controller 421 or receiving data from the controller 421, a sensor module 414 for detecting at least one of the position, posture, or motion information of the UAV 411, and a processor 412 functionally connected with the other components of the UAV 411 to implement functions of the UAV 411 by controlling all or some of the other components of the UAV 411. The components of the UAV 411 may be mounted in a housing 413 (or a casing) or integrated or combined therewith (or positioned therein).

The controller 421 may include a communication module 427 for transmitting data to the UAV 411 or receiving data from the UAV 411, a sensor module 424 for detecting at least one of the position, posture, or motion information of the controller 421 or a display 426, the display 426 for displaying images and videos received from the UAV 411, and a processor 422 functionally connected with the components of the controller 421 to implement functions of the controller 421 by controlling all or some of the components. The components of the controller 421 may be mounted in a housing 423 (or a casing), or integrated or combined therewith (or positioned therein).

According to an embodiment of the present disclosure, the controller 421 may be configured as a combination of the electronic device 101 and the electronic device 102 (and/or the electronic device 103).

According to an embodiment of the present disclosure, an electronic device includes a housing, a display mounted or combined with the housing, a wireless communication circuit configured to establish wireless communication with a UAV including an omni-directional camera, at least one sensor disposed in the housing and configured to detect an orientation of the display, a processor disposed in the housing and electrically connected with the display, the wireless communication circuit, and the at least one sensor, and a memory disposed in the housing and electrically connected with the processor. The memory stores instructions executed to enable the processor to receive video data captured by the omni-directional camera of the UAV through the wireless communication circuit while the UAV faces in a first direction, display a video on the display based on at least part of the video data, receive an input (or a user input) to select an area or object on the video positioned in a second direction different from the first direction, transmit a control signal configured to indicate the second direction and to fly the UAV without rotation in the second direction through the wireless communication circuit to the UAV in response to the input, and receive the video data captured by the omni-directional camera of the UAV through the wireless communication circuit from the UAV while the UAV faces in the second direction.

The instructions enable the processor to receive a first input (or first user input) to select the area or object on the video through the display and receive a second input (or second user input) to move the UAV in the second direction through the display.

According to an embodiment of the present disclosure, an electronic device includes a display, a wireless communication circuit configured to transmit or receive data, a processor, and a memory electrically connected with the processor. The memory stores instructions executed to enable the processor to display, on the display, a first video portion corresponding to a reference or actual heading direction of a UAV of a video captured by the UAV, display, on the display, a second video portion corresponding to a virtual heading direction of the video in response to a first input, when a preset condition is met, generate a first control signal to move the UAV with respect to the reference heading direction, transmit the generated first control signal through the wireless communication circuit to the UAV, upon failing to meet the preset condition, generate a second control signal to move the UAV with respect to the reference heading direction, and transmit the generated second control signal through the wireless communication circuit to the UAV.

According to an embodiment of the present disclosure, an electronic device includes a display, a wireless communication circuit configured to transmit or receive data, a processor, and a memory electrically connected with the processor. The memory stores instructions executed to enable the processor to display, on the display, a first video portion corresponding to a reference or actual heading direction of a UAV of a video captured by the UAV, display, on the display, a second video portion corresponding to a virtual heading direction of the video in response to a first input, and in response to a second input, generate a first control signal to move the UAV with respect to the virtual heading direction and transmit the generated first control signal through the wireless communication circuit to the UAV.

The instructions may enable the processor to, in response to a third input (or a third user input), generate a second control signal to move the UAV with respect to the actual heading direction and transmit the generated second control signal through the wireless communication circuit to the UAV.

The second input and the third input may indicate the same motion, and the first control signal and the second control signal may indicate different motions.

The second input and the third input may indicate the same motion, the second control signal may indicate a motion in a first direction, and the first control signal may indicate a combination of the motion in the first direction and a motion in a second direction.

The first direction may be a front or rear direction, and the second direction may be a side direction.

The second input and the third input may indicate the same motion, the first control signal may indicate pitch rotation, and the second control signal may indicate a combination of pitch rotation and roll rotation.

The first control signal may include information about the virtual heading direction and information about the second input.

The instructions may enable the processor to transmit the information about the virtual heading direction through the wireless communication circuit to the UAV.

The instructions may enable the processor to receive a video obtained by capturing an ambient space of the UAV from the UAV through the wireless communication circuit.

The instructions may enable the processor to transmit a third control signal indicating the start of image capturing through the wireless communication circuit to the UAV and receive a video obtained by capturing an ambient space of the UAV from the UAV through the wireless communication circuit.

The instructions may enable the processor to transmit a fourth control signal indicating the end of image capturing through the wireless communication circuit to the UAV.

The first video portion may correspond to a first area of the ambient space, and the second video portion may correspond to a second area of the ambient space.

The instructions may enable the processor to compare a value related to a motion of the electronic device or a value related to the user's gaze motion with a preset threshold, and when the motion-related value is the threshold or more, determine that the first input has been detected.

The first control signal may be set to enable the UAV to remain in the reference heading direction after moving the UAV.

The first control signal may be set to enable the UAV to move without yaw rotation.

The second input may be an input to select an object from the second video portion.

According to an embodiment of the present disclosure, a UAV includes a housing, an omni-directional camera module mounted in the housing, a wireless communication circuit configured to establish wireless communication with a controller, a plurality of propellers, a navigation circuit configured to drive the propellers, a processor disposed in the housing and electrically connected with the camera module, the wireless communication circuit, and the navigation circuit, and a memory disposed in the housing and electrically connected with the processor. The memory stores instructions executed to enable the processor to establish wireless communication with the controller using the wireless communication circuit, transmit video data captured by the omni-directional camera through the wireless communication circuit to the controller while the UAV faces in a first direction, receive a control signal indicating a second direction different from the first direction through the wireless communication circuit, control the navigation circuit to fly the UAV without rotation in the second direction, and transmit the video data captured by the omni-directional camera through the wireless communication circuit to the controller while the UAV faces in the second direction.

According to an embodiment of the present disclosure, a UAV includes a housing, an omni-directional camera module mounted in the housing, a wireless communication circuit configured to establish wireless communication with a controller, a plurality of propellers, a navigation circuit configured to drive the propellers, a processor disposed in the housing and electrically connected with the camera module, the wireless communication circuit, and the navigation circuit, and a memory disposed in the housing and electrically connected with the processor. The memory stores instructions executed to enable the processor to transmit a video captured by the UAV to a controller, receive a first control signal from the controller, when a preset condition is met, convert the first control signal into a control signal to move the UAV with respect to a virtual heading direction and move according to the converted control signal, and unless the preset condition is met, move with respect to the reference heading direction of the UAV according to the first control signal.

According to an embodiment of the present disclosure, a UAV includes a housing, an omni-directional camera module mounted in the housing, a wireless communication circuit configured to establish wireless communication with a controller, a plurality of propellers, a navigation circuit configured to drive the propellers, a processor disposed in the housing and electrically connected with the camera module, the wireless communication circuit, and the navigation circuit, and a memory disposed in the housing and electrically connected with the processor. The memory stores instructions executed to enable the processor to transmit a video captured by the UAV to a controller, receive a first control signal from the controller, convert the first control signal into a control signal to move the UAV with respect to a virtual heading direction, and move according to the converted control signal.

The instructions may enable the processor to receive, from the controller, a second control signal to move the UAV with respect to the reference heading direction of the UAV and move according to the second control signal.

The first control signal may indicate a motion in a first direction, and the converted control signal may indicate a combination of the motion in the first direction and a motion in a second direction.

The first control signal may indicate pitch rotation, and the converted control signal may indicate a combination of pitch rotation and roll rotation.

The instructions may enable the processor to receive, from the controller, information about the virtual heading direction.

The instructions may enable the processor to receive a third control signal indicating the start of image capturing from the controller and start image capturing according to the third control signal.

The instructions may enable the processor to receive a fourth control signal indicating the end of image capturing from the controller and end image capturing according to the fourth control signal.

The converted control signal may be set to enable the UAV to remain in the reference heading direction after moving the UAV.

The converted control signal may be set to enable the UAV to move without yaw rotation.

Figure 5A:
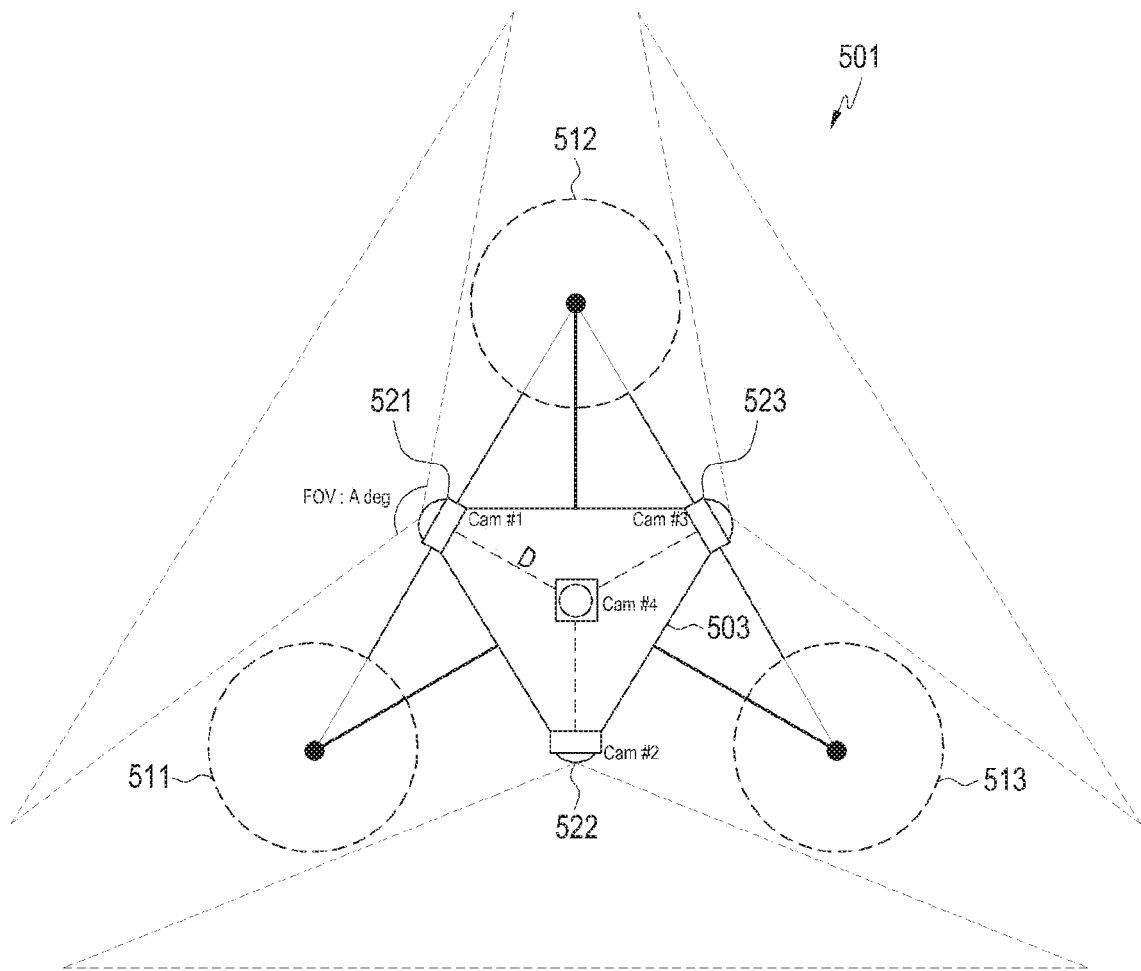
FIGS. 5A and 5B illustrate a structure of a tri-rotor UAV according to an embodiment of the present disclosure.
Figure 5B:
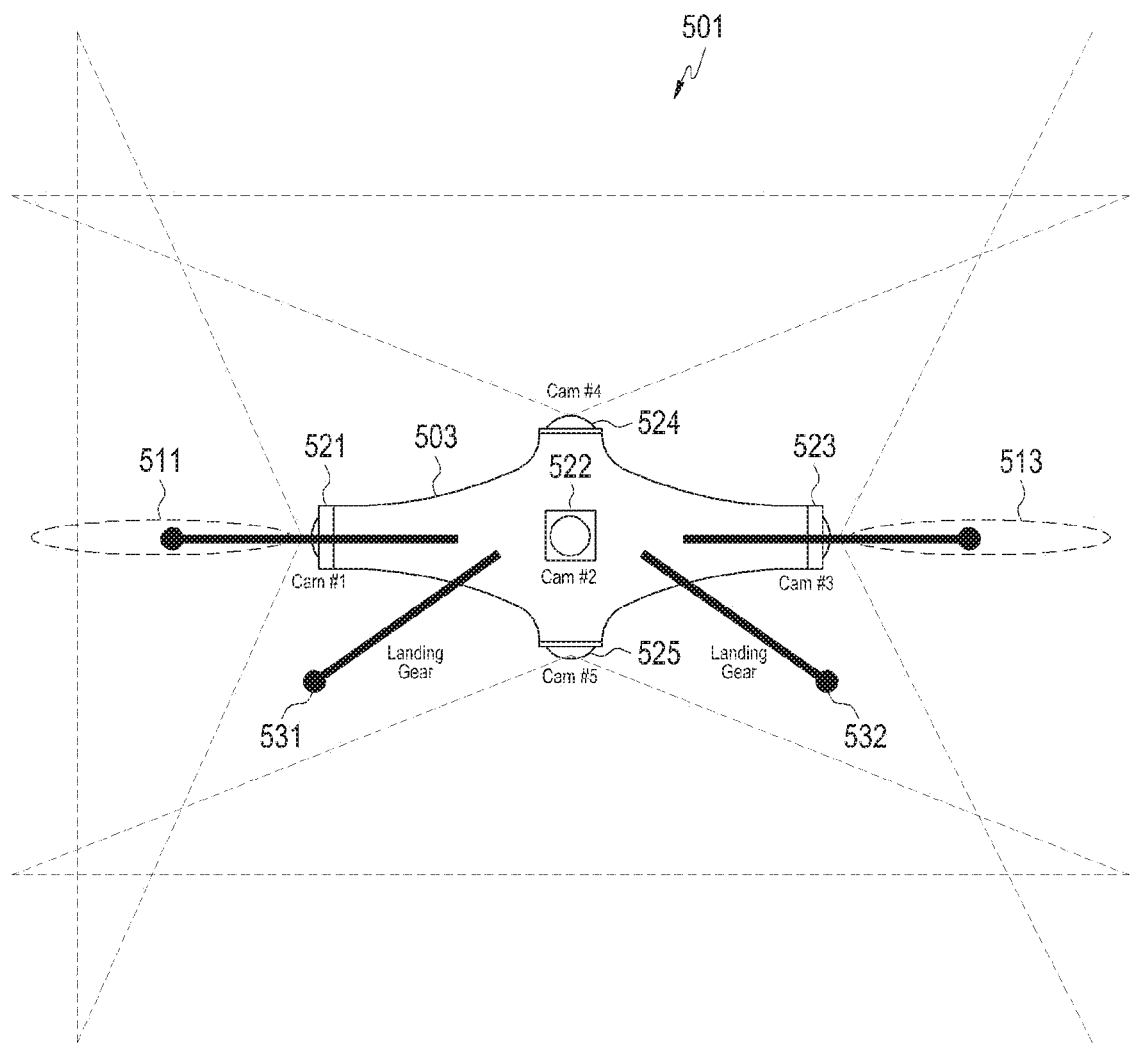

FIGS. 5A and 5B illustrate a structure of a tri-rotor UAV according to an embodiment of the present disclosure. FIG. 5A is a plan view of a tri-rotor UAV, and FIG. 5B is a side view of the tri-rotor UAV.

Referring to FIGS. 5A and 5B, the tri-rotor UAV 501 may include a first to third propellers 511, 512, and 513, and a first to fifth camera modules 521, 522, 523, 524, and 525 mounted in a housing 503. The first to fifth camera modules 521, 522, 523, 524, and 525 each may have a field of view (FOV) (or angle of view) of 120 degrees. The first to third camera modules 521, 522, and 523 provided on the side surface of the housing 503 each may be positioned between the propellers. Each camera module 521, 522, and 523 may be spaced away from the central axis of the UAV 501 by a distance D to prevent the structure (e.g., the propeller or housing) of the UAV 501 from appearing within the FOV. The fourth and fifth camera modules 524 and 525, respectively, arranged on the top and bottom of the housing 503 may be positioned at the center of the UAV 501. The arrangement of the camera modules 521, 522, 523, 524, and 525 may apply likewise to hexa-rotor or tri-rotor UAVs that have overlapping propellers. Landing gears 531 and 532 may be arranged off the FOV of the camera modules 521, 522, 523, 524, and 525.

Figure 6A:
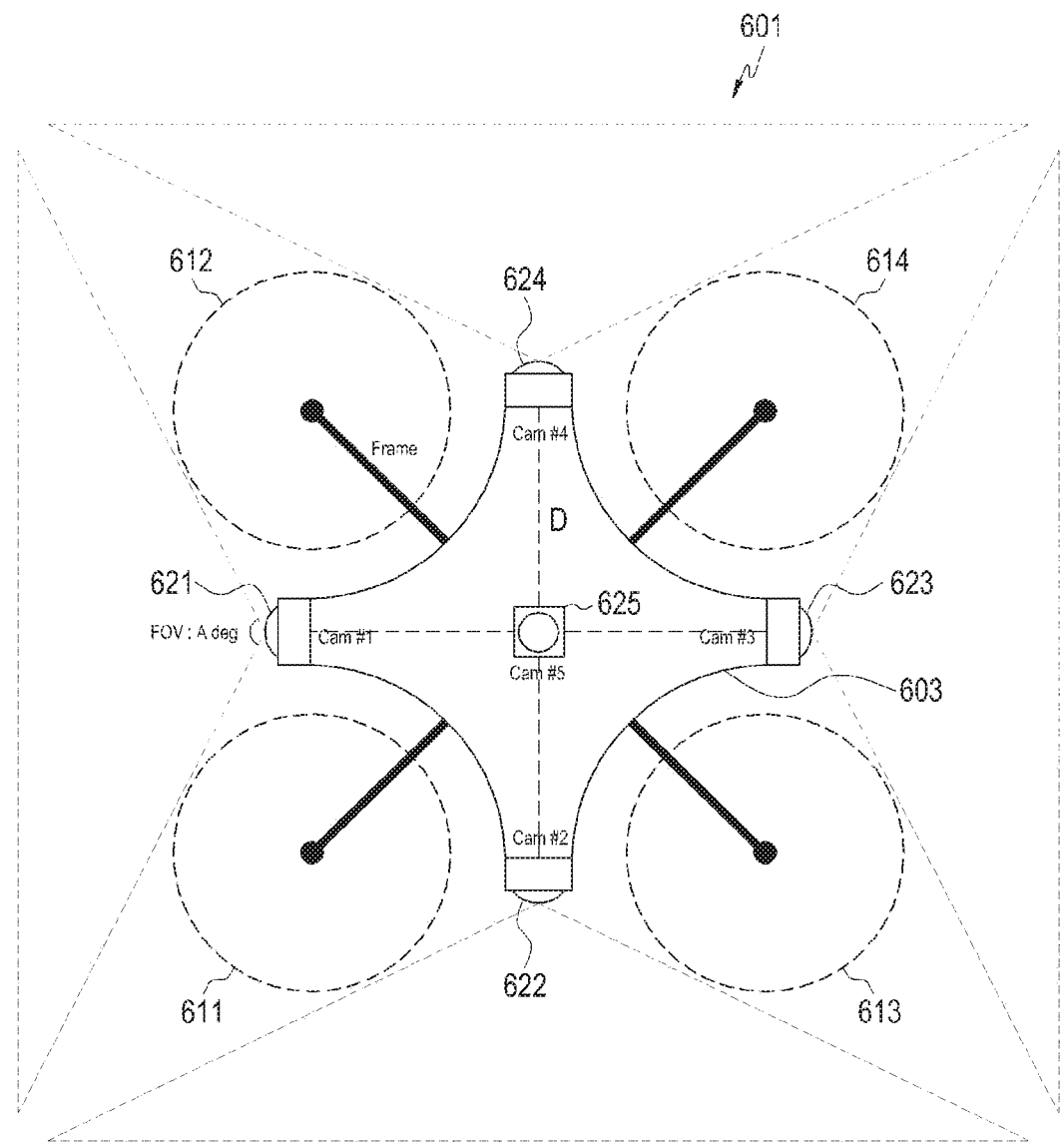
FIGS. 6A and 6B illustrate a structure of a quad-rotor UAV according to an embodiment of the present disclosure.
Figure 6B:
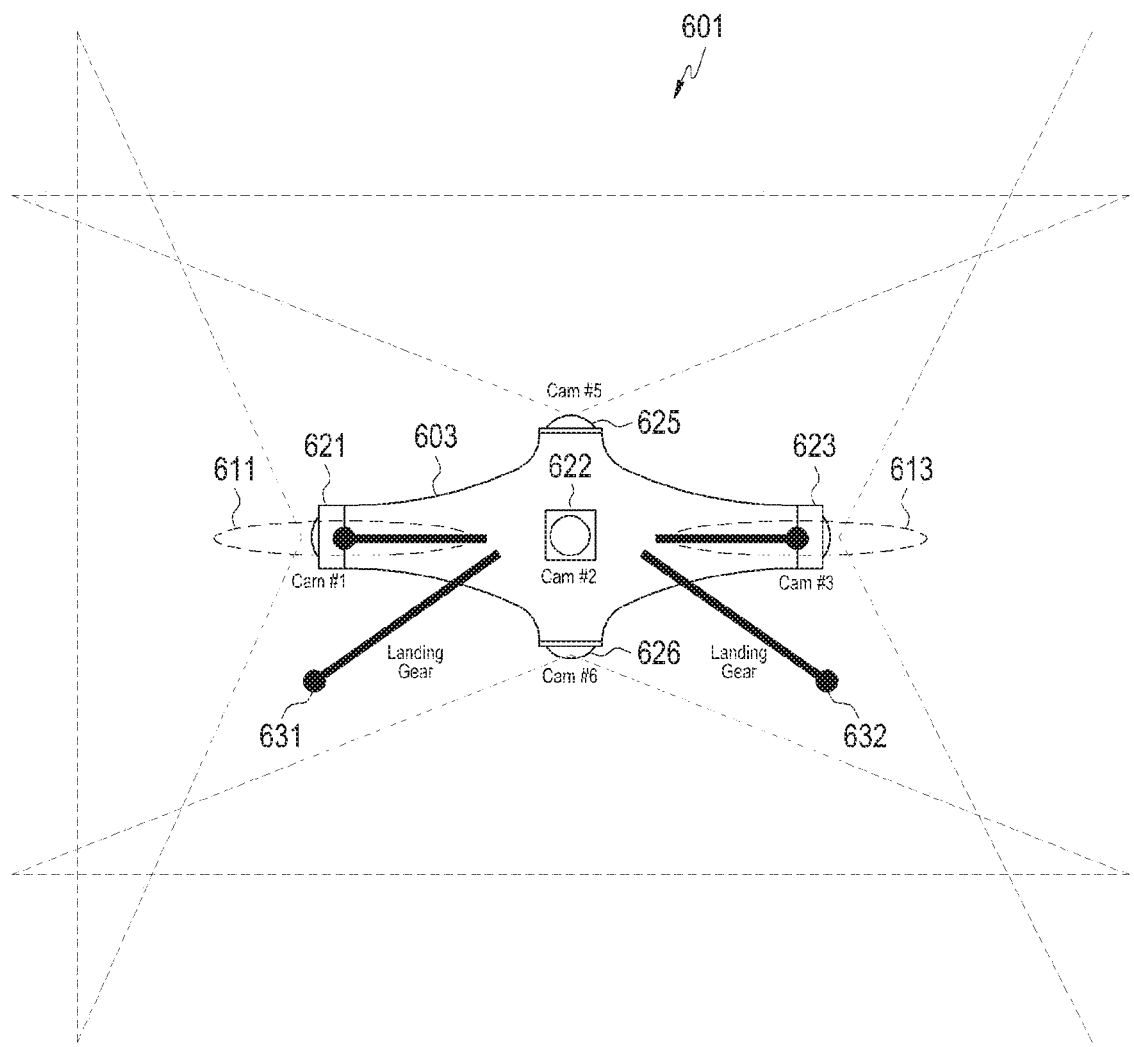

FIGS. 6A and 6B illustrate a structure of a quad-rotor UAV according to an embodiment of the present disclosure. FIG. 6A is a plan view of a quad-rotor UAV, and FIG. 6B is a side view of the quad-rotor UAV.

Referring to FIGS. 6A and 6B, the quad-rotor UAV 601 may include a first to fourth propellers 611, 612, 613, and 614, and a first to sixth camera modules 621, 622, 623, 624, 625, and 626 mounted in a housing 603. The first to sixth camera modules 621, 622, 623, 624, 625, and 626 each may have an FOV of 90 degrees or more. The first to fourth camera modules 621, 622, 623, and 624 may be mounted on the side surface of the housing 603 and may be positioned between the propellers. Each camera module 621, 622, 623, and 624 may be spaced away from the central axis of the UAV 601 by a distance D to prevent the structure of the UAV 601 from appearing within the FOV. The fifth and sixth camera modules 625 and 626, respectively, arranged on the top and bottom of the housing 603 may be positioned at the center of the UAV 601. Landing gears 631 and 632 may be arranged off the FOV of the camera modules 621, 622, 623, 624, 625, and 626.

Figure 7A:
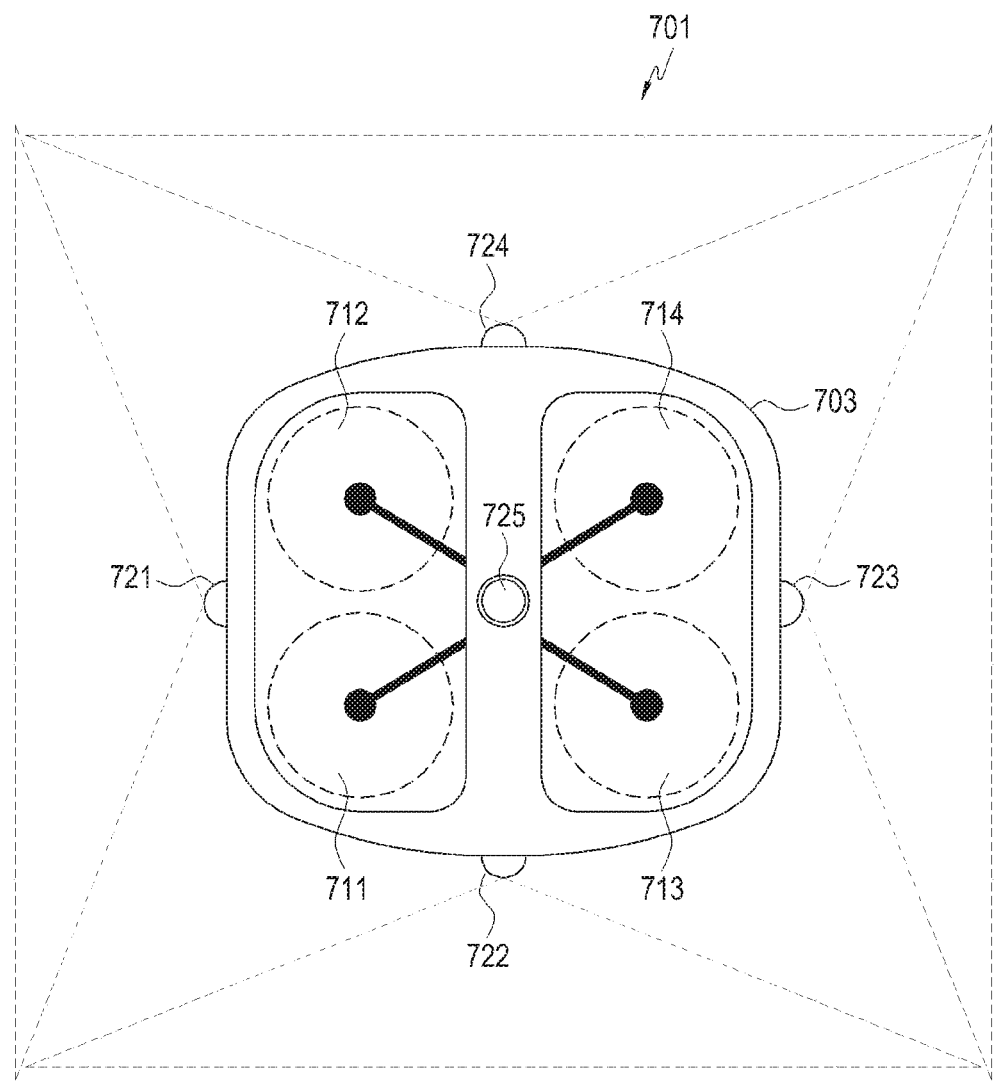
FIGS. 7A and 7B illustrate a structure of a quad-rotor UAV according to an embodiment of the present disclosure.
Figure 7B:
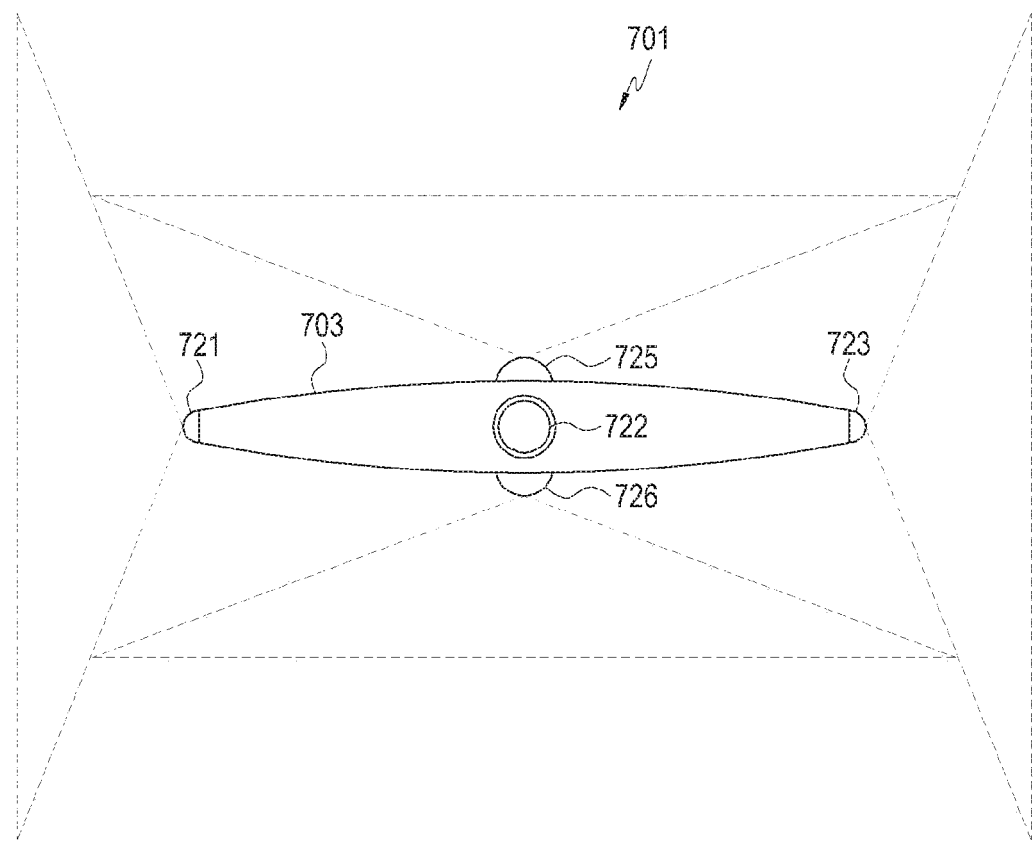

FIGS. 7A and 7B illustrate a structure of a quad-rotor UAV according to an embodiment of the present disclosure. FIG. 7A is a plan view of a quad-rotor UAV, and FIG. 7B is a side view of the quad-rotor UAV.

Referring to FIGS. 7A and 7B, the quad-rotor UAV 701 may include a first to fourth propellers 711, 712, 713, and 714, and a first to sixth camera modules 721, 722, 723, 724, 725, and 726 mounted/in a housing 703. The first to sixth camera modules 721, 722, 723, 724, 725, and 726 each may have an FOV of 90 degrees or more. The housing 703 may include a guard portion disposed to surround the first to fourth propellers 711, 712, 713, and 714. The first to fourth camera modules 721, 722, 723, and 724 may be arranged on the outside surface of the guard portion. Each camera module 721, 722, 723, and 724 may be positioned to prevent the structure of the UAV 701 from being imaged within the FOV. The fifth and sixth camera modules 725 and 726, respectively, arranged on the top and bottom of the housing 703 may be positioned at the center of the UAV 701.

Figure 8A:
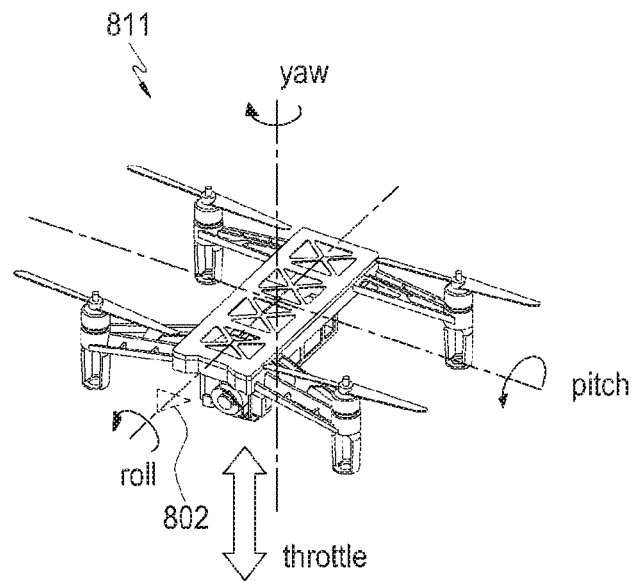
FIGS. 8A and 8B illustrate a method for controlling a UAV according to an embodiment of the present disclosure.
Figure 8B:
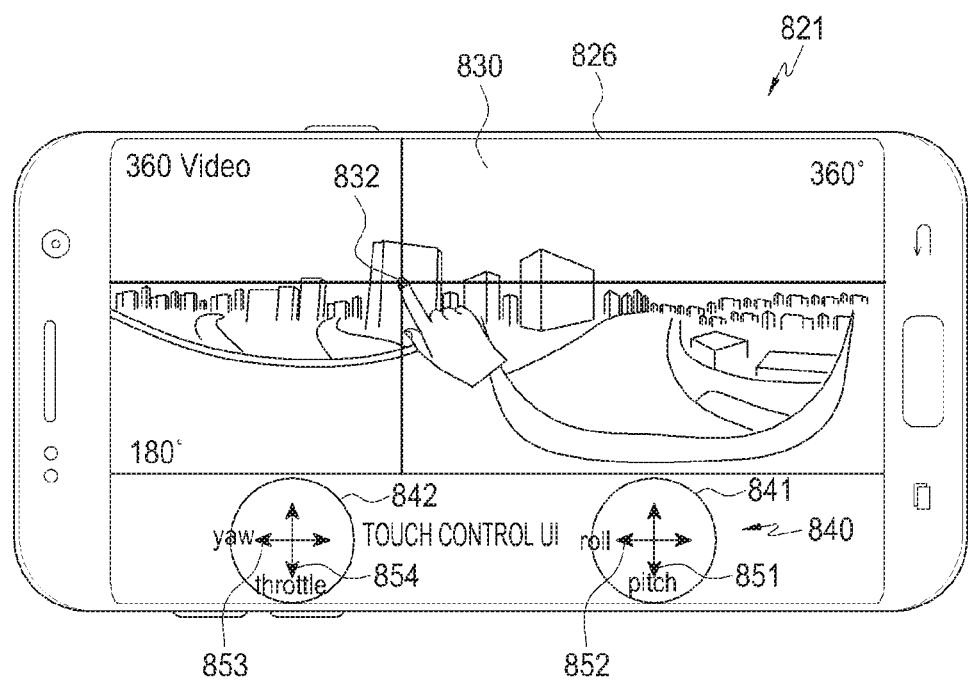

FIGS. 8A and 8B illustrate a method for controlling a UAV according to an embodiment of the present disclosure.

Referring to FIG. 8A, the term 'pitch' (or 'pitch rotation' or 'pitch control') may refer to moving the UAV 811 forwards/backwards (or in a reference/actual heading direction) with respect to the reference/actual heading direction 802 or rotating the UAV 811 clockwise/counter-clockwise around the pitch axis (y axis). The term 'roll' (or 'roll rotation' or 'roll control') may mean moving the UAV 811 to the left/right or rotating the UAV 811 clockwise/counter-clockwise around the roll axis (x axis). The term 'yaw' (or 'yaw rotation' or 'yaw control') may mean rotating the UAV 811 in place or clockwise/counter-clockwise around the yaw axis (z axis). The term 'throttle' (or 'throttle motion,' 'throttle lift,' or 'throttle control') may mean moving up/down the UAV 811.

Referring to FIG. 8B, the controller 821 may display an image and/or video 830 transmitted from the UAV 811 on the display 826. The controller 821 may display a touch control user interface (UI) 840 for controlling the UAV 811 on the display 826. The touch control UI 840 may include a first control area 841 and a second control area 842. In response to a vertical swipe/drag gesture 851 on the first control area 841, the controller 821 may transmit a control signal for pitch-rotating the UAV 811 to the UAV 811. In response to a horizontal swipe/drag gesture 852 on the first control area 841, the controller 821 may transmit a control signal for roll-rotating the UAV 811 to the UAV 811. In response to a horizontal swipe/drag gesture 853 on the second control area 842, the controller 821 may transmit a control signal for yaw-rotating the UAV 811 to the UAV 811.

In response to a vertical swipe/drag gesture 854 on the second control area 842, the controller 821 may transmit a control signal for throttle-moving (or throttle-lifting or throttle-controlling) the UAV 811 to the UAV 811.

In response to an input for selecting an object 832 or area positioned in a direction different from the reference/actual heading direction 802 in the image and/or video 830 displayed on the display 826, the controller 821 may transmit, to the UAV 811, a control signal configured to indicate the different direction and to fly the UAV 811 in the different direction without rotation (or without yaw rotation).

In response to an input for selecting an object 832 or area positioned in a direction different from the reference/actual heading direction 802 in the image and/or video 830 displayed on the display 826, the controller 821 may set the different direction as the virtual heading direction.

The controller 821 may transmit information about the virtual heading direction to the UAV 811.

In response to an input on the touch control UI 840 that is generated after setting the virtual heading direction, the controller 821 may transmit, to the UAV 811, a control signal for moving the UAV 811 with respect to the virtual heading direction.

Figure 9:
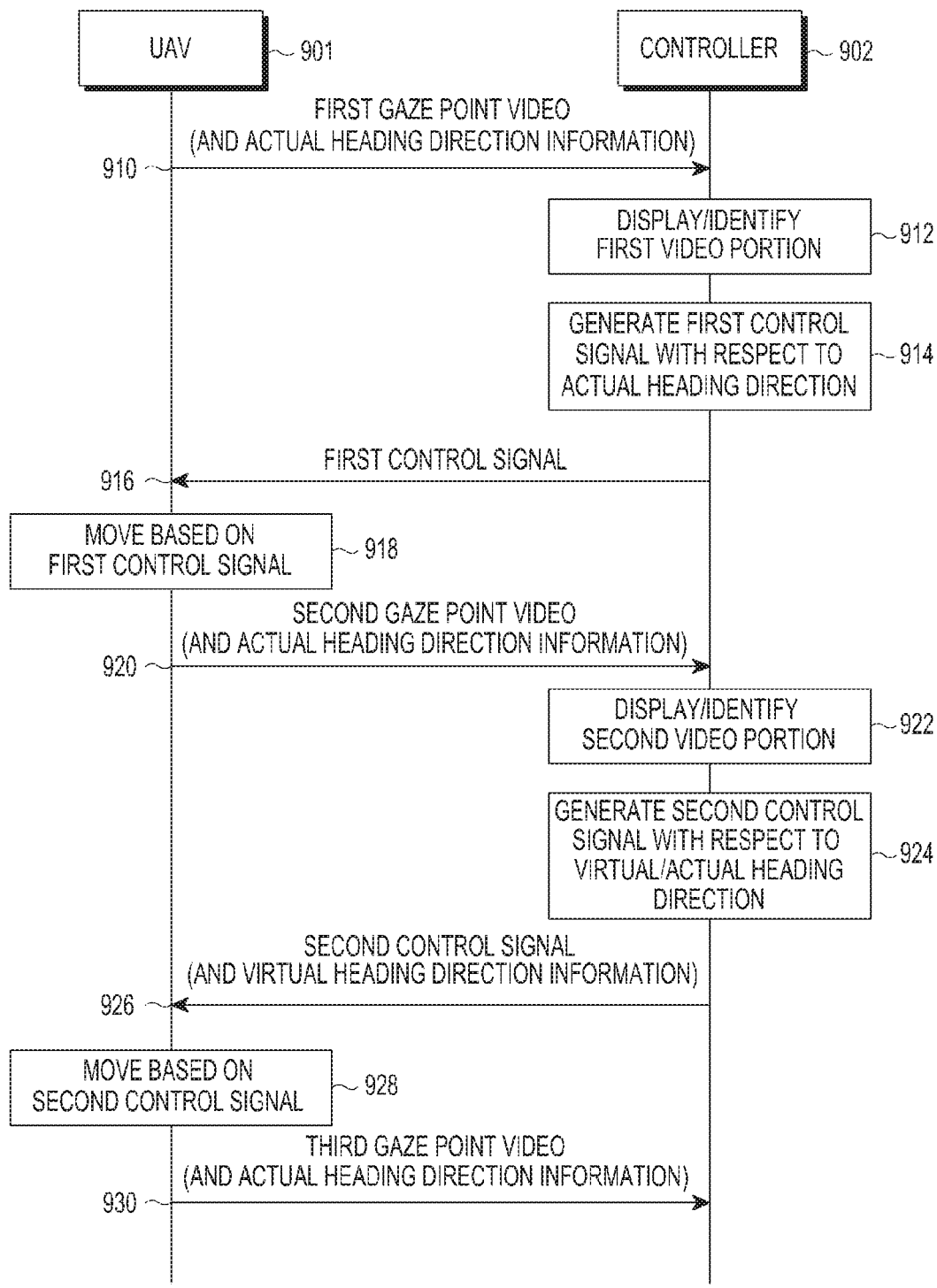
FIG. 9 is a flowchart illustrating a method for controlling a UAV according to an embodiment of the present disclosure.

FIG. 9 is a flowchart illustrating a method for controlling a UAV according to an embodiment of the present disclosure. The control method may include steps 910 to 930. The control method may be performed by a UAV 90 l and a controller 902, or by the processors of UAV 901 and controller 902, respectively.

In step 910, the UAV 901 may transmit, to the controller 902, video data in a first gaze point (or a first camera view point or position), e.g., a video captured in the first gaze point.

According to another embodiment of the present disclosure, the controller 902 may transmit, to the UAV 901, a third control signal to indicate the start of image capturing in response to a fourth input (or a fourth user input). The UAV 901 may start to capture an ambient space in response to the third control signal and transmit, to the controller 902, video data in the first gaze point (or position) obtained by capturing the ambient space of the UAV 901.

The UAV 901 may in real time transmit the video data obtained by capturing the ambient space to the controller 902.

The UAV 901 may transmit the video data (e.g., 360-degree video or panoramic video) representing the ambient space to the controller 902.

The UAV 901 may transmit information about the reference/actual (or current) heading direction, together or separately from the first gaze-point video data, to the controller 902.

The controller 902 may obtain information about the reference/actual heading direction from the first gaze-point video data.

While the UAV 901 faces in the first direction, the controller 902 may receive video data captured by the omni-directional cameras of the UAV 901.

In step 912, the controller 902 may display/identify a first video data portion corresponding to the reference/actual heading direction of the UAV 901 of the first gaze-point video data received from the UAV 901. The controller 902 may display and/or identify the first video data portion corresponding to the reference/actual heading direction in response to an input or automatically.

In step 914, the controller 902 may generate a first control signal to move the UAV 901 with respect to the reference/actual heading direction in response to a first input.

For example, the first input may include at least one of a preset touch/hovering gesture (e.g., at least one of a swipe gesture, drag gesture, or scroll) on the display, selection of a graphical element displayed on the display, a voice command, or a motion input.

According to an embodiment of the present disclosure, the controller 902 may detect the first input on a control UI, the first video data portion, or second gaze-point video data.

According to an embodiment of the present disclosure, the first input may include at least one of a preset touch/hovering gesture (e.g., at least one of a swipe gesture, drag gesture, or scroll) on the display 160, selection of a graphical element displayed on the display, a voice command, or a motion input.

In step 916, the controller 902 may transmit a first control signal to the UAV 901.

In step 918, the UAV 901 may move from the first gaze point (or the first camera view point or position) to a second gaze point (or second camera view point or position) based on the first control signal.

In step 920, the UAV 901 may transmit, to the controller 902, video data in the second gaze point (or a second camera view point or position), e.g., a video captured in the second gaze point.

According to an embodiment of the present disclosure, the UAV 901 may transmit information about the reference/actual (or current) heading direction, together or separately from the second gaze-point video data, to the controller 902.

In step 922, the controller 902 may display or identify a second video data portion corresponding to an actual heading direction of the UAV 901 of the second gaze-point video data received from the UAV 901 in response to a second input. For example, the controller 902 may detect the second input on the second gaze-point video data.

In step 924, the controller 902 may generate a second control signal to move the UAV 901 with respect to the reference/actual heading direction in response to a third input.

The controller 902 may detect the third input on a control UI, the second video data portion, or second gaze-point video data.

The third input may include at least one of a preset touch/hovering gesture (e.g., at least one of a swipe gesture, drag gesture, or scroll) on the display, selection of a graphical element displayed on the display, a voice command, or a motion input.

In step 926, the controller 902 may transmit a second control signal to the UAV 901.

The controller 902 may transmit information about the virtual heading direction, together or separately from the second control signal, to the UAV 901.

In step 928, the UAV 901 may move from the second gaze point to a third gaze point (or position) based on the second control signal.

According to an embodiment of the present disclosure, the first input and third input may indicate the same motion, and the first control signal and second control signal may indicate different motions. For example, it is assumed that the reference/actual heading direction has a horizontal azimuth of 0 degrees and that the virtual heading direction has a horizontal azimuth of 90 degrees. Where the first input and the third input are vertical swipe/drag gestures 851 on the first control area 841 to move the UAV 901 forward (or in the reference/actual heading direction), the first control signal may indicate moving the UAV 901 forward (or in the reference/actual heading direction), and the second control signal may indicate moving the UAV 901 to the right.

According to an embodiment of the present disclosure, the first input and the third input may indicate the same motion, the first control signal may indicate the motion in a first direction, and the second control signal may indicate a combination of the motion in the first direction and the motion in a second direction. For example, it is assumed that the reference/actual heading direction has a horizontal azimuth of 0 degrees and that the virtual heading direction has a horizontal azimuth of 45 degrees. Where the first input and the third input are vertical swipe/drag gestures 851 on the first control area 841 to move the UAV 901 forward (or in the reference/actual heading direction), the first control signal may indicate moving the UAV 901 forward (or in the reference/actual heading direction), and the second control signal may indicate a combination of (or simultaneously/sequentially performing) moving the UAV 901 forward and moving the UAV 901 to the right.

According to an embodiment of the present disclosure, the first input and third input may indicate the same motion, and the first control signal and second control signal may indicate the same motion. For example, it is assumed that the reference/actual heading direction has a horizontal azimuth of 0 degrees and that the virtual heading direction has a horizontal azimuth of 90 degrees. Where the first input and the third input are vertical swipe/drag gestures 851 on the first control area 841 to move the UAV 901 forward, the first control signal and second control signal may indicate moving the UAV 901 forward (or in the reference/actual heading direction). The UAV 901 may move to the right in response to the information about the virtual heading direction and the first control signal.

In step 930, the UAV 901 may transmit, to the controller 902, video data in the third gaze point (or a third camera view point or position), e.g., a video captured in the third gaze point.

According to an embodiment of the present disclosure, the UAV 901 may transmit information about the reference/actual (or current) heading direction, together or separately from the third gaze-point video data, to the controller 902.

Figure 10A:
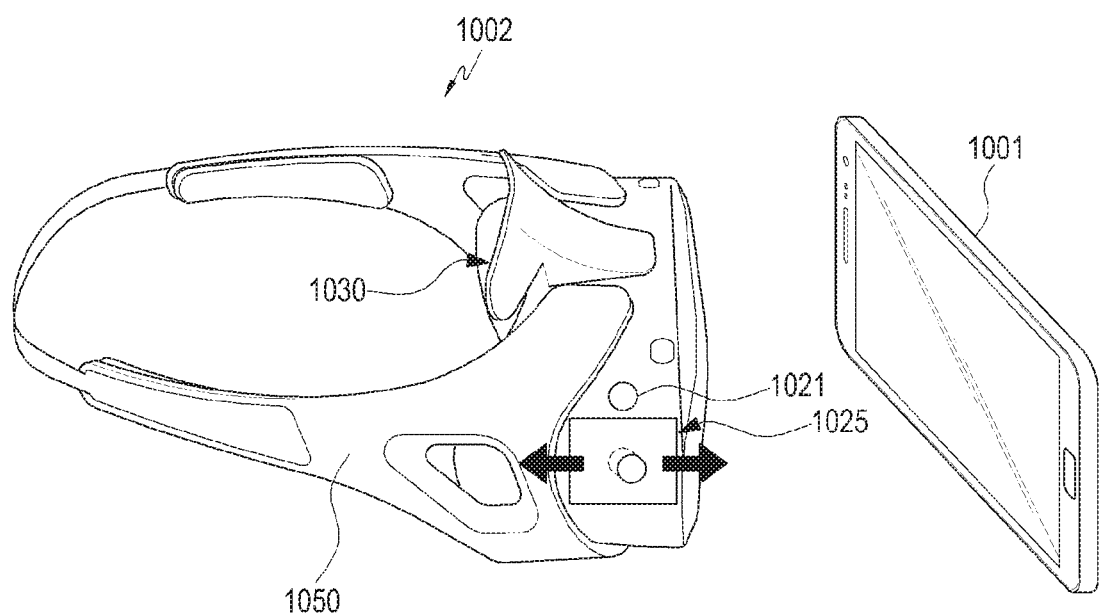
FIGS. 10A, 10B, and 10C illustrate a controller according to an embodiment of the present disclosure.
Figure 10B:
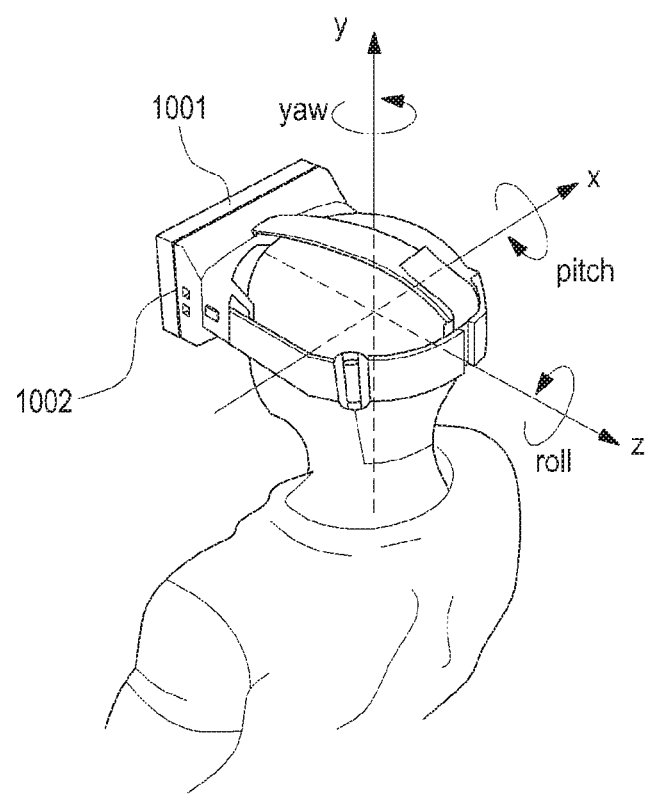
Figure 10C:
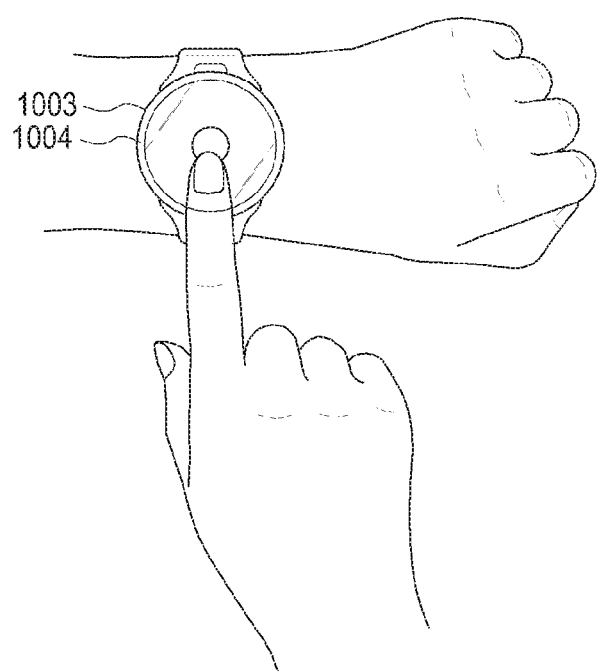

FIGS. 10A, 10B, and 10C illustrate a controller according to an embodiment of the present disclosure. The controller may include a first electronic device 1001, a second electronic device 1002, and a third electronic device 1003.

Referring to FIG. 10A, the first electronic device 1001 may store a 3D application (or a VR application) and a 3D graphic library. The 3D application may be an application capable of providing a user with a screen that looks real.

According to an embodiment of the present disclosure, VR may mean a virtual space where the user may turn and look around from the center of the user (or, a starting point or camera). The VR may be one obtained by rendering a virtual space, which may represent 360 degrees, on the screen, such as a 360-degree video, 360-degree image content, or a 3D graphic modeling space. For example, the first electronic device 1001 may provide the VR based on a video received from a UAV.

The 3D application may display an image and/or video for the left eye and an image and/or video for the right eye, respectively, corresponding the left and right eye of the user based on a stereo scheme.

The second electronic device 1002 may be an HMD. The HMD device may be worn on the user's head to and stay attached to the user's head despite the user's movement. The first electronic device 1001 may be connected with the second electronic device 1002. Accordingly, the user may wear the second electronic device 1002 connected with the electronic device 1001, viewing the image and/or video for left eye and the image and/or video for right eye displayed on the display of the first electronic device 1001.

The second electronic device 1002 may include a housing 1050 worn on the user's head, a dark change portion 1030 provided at a region corresponding to the user's eyes, and at least one input button 1021 provided at a region of the housing 1050. The second electronic device 1002 may include a touch pad 1025 through which an input (e.g., a swipe input) may be received from the user.

The user may bring his eyes in close contact with the dark change portion 1030, allowing the user to observe an image and/or video by the 3D application provided from the first electronic device 1001 without interference by external light.

The first electronic device 1001 may be connected with the second electronic device 1002 and/or the third electronic device 1003. The first electronic device 1001 may be connected by a wired and/or wireless method with the second electronic device 1002 and/or the third electronic device 1003. For example, the first electronic device 1001 may be connected with the second electronic device 1002 and/or the third electronic device 1003 via USB. It will be appreciated by one of ordinary skill in the art that any other connections that enable data communication between the first and second electronic devices 1001 and 1002 may be used without limitation.

According to an embodiment of the present disclosure, the first electronic device 1001 and the second electronic device 1002 may be integrated in a single HMD VR device.

Referring to FIG. 10B, the user may put the housing of the second electronic device 1002 on his/her head. Further, the first electronic device 1001 may be combined with the second electronic device 1002. The user may view images and/or videos displayed on the display of the first electronic device 1001.

The first electronic device 1001 may display an image and/or video for the left eye and an image and/or video for the right eye on the left and the right portions, respectively, of the display. The image and/or video for the left eye may be incident onto the user's left eye, and the image and/or video for the right eye may be incident onto the user's right eye. For example, the image and/or video for the left eye and the image and/or video for the right eye both may be incident onto each of the user's eyes. The user may receive a VR service by observing the images and/or videos incident onto his/her eyes. According to an embodiment of the present disclosure, the image and/or video for the left eye and the image and/or video for the right eye may be images and/or videos for a VR service and may be images and/or videos configured to provide a stereoscopic feeling for at least part of the overall screen for a VR service. For example, the image and/or video for the left eye and the image and/or video for the right eye may be produced to be different from each other to provide a feeling of depth. The user may feel a depth by observing a different image and/or video through each of their eyes.

The 3D application executed on the first electronic device 1001 may allow for display of an image and/or video for both eyes on the display. Further, the 3D application may vary and display the image and/or video for both eyes according to a motion (e.g., yaw, pitch, or roll) of the user, or the electronic device 1001, 1002, or 1003.

Referring to FIG. 10C, the third electronic device 1003 may display a touch control UI for controlling a UAV on the display 1004. In response to a swipe/drag gesture on the touch control UI, the third electronic device 1003 may transmit control signals to the UAV 811 to pitch-rotate/roll-rotate/throttle-move the UAV 811.

Figure 11A:
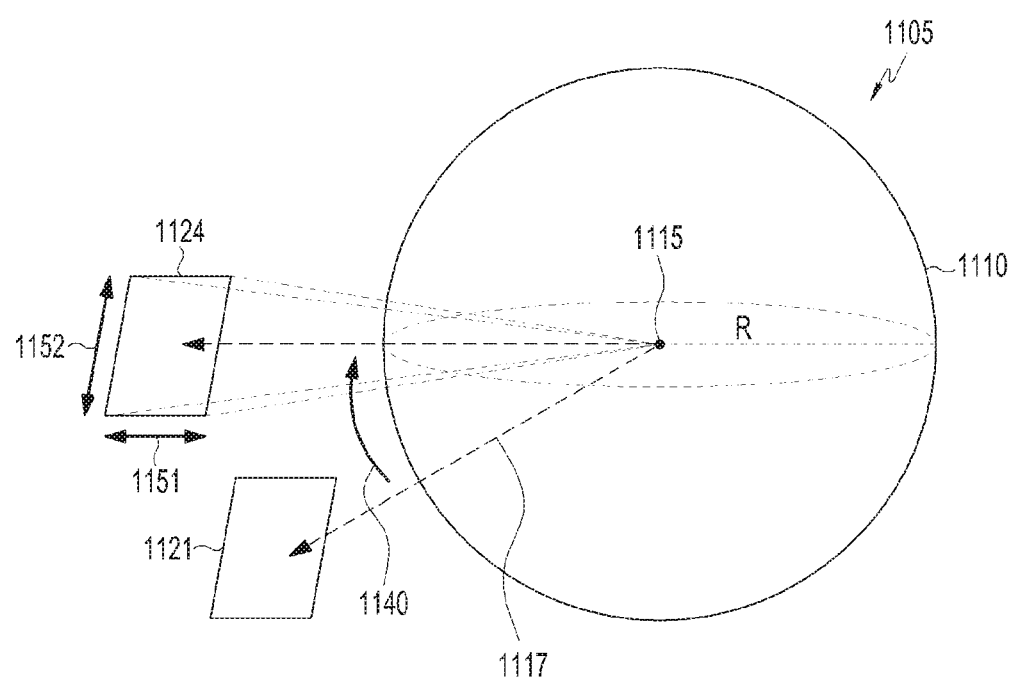
FIG. 11A illustrates a three-dimensional (3D) space according to an embodiment of the present disclosure.
Figure 11B:
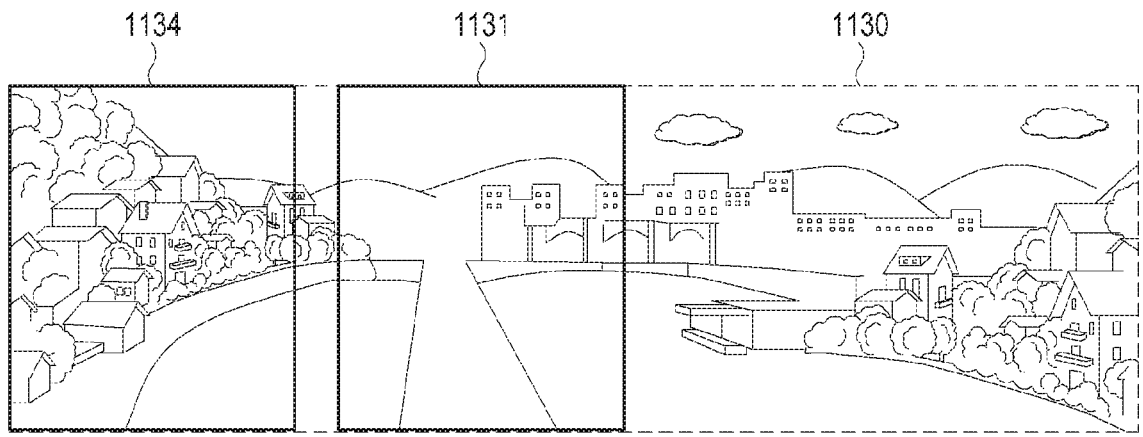
FIGS. 11B and 11C illustrate updating a screen of an electronic device according to an embodiment of the present disclosure.
Figure 11B:
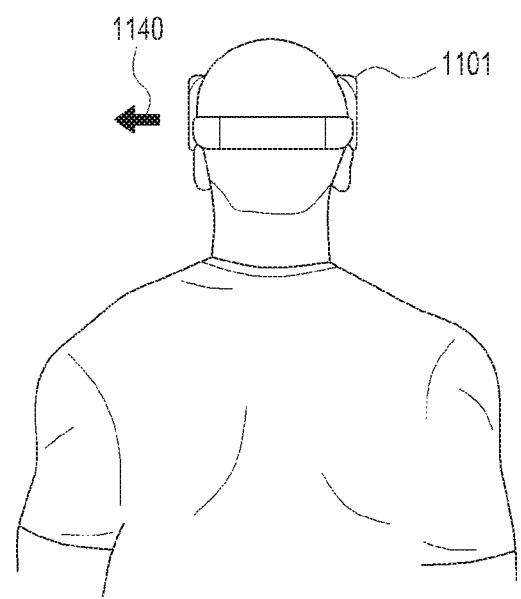
Figure 11C:
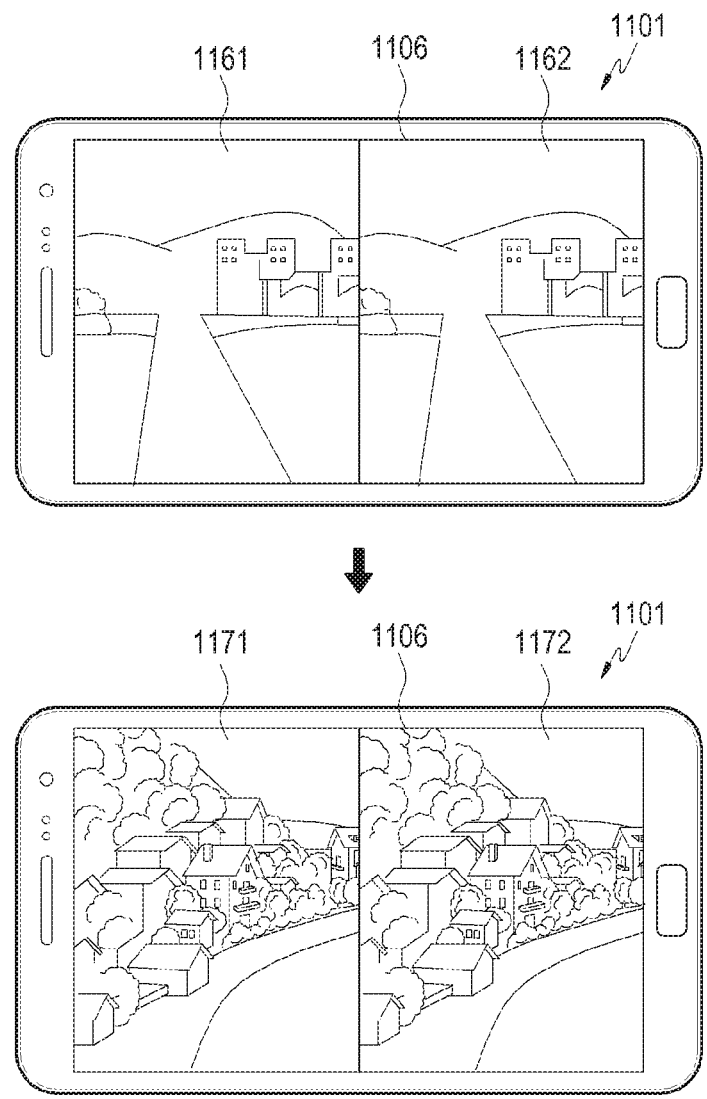

FIG. 11A is a view illustrating a 3D space according to an embodiment of the present disclosure. FIGS. 11B and 11C are views illustrating screen updates in an electronic device according to an embodiment of the present disclosure.

Referring to 11A, 11B, and 11C, the 3D space 1105 may be implemented by at least one of an electronic device 1101, a processor of the electronic device 1101, or a controller of the electronic device 1101.

The 3D space 1105 may be implemented by mapping a wide-angle image and/or video to a preset 3D model 1110 (e.g., a sphere having a preset radius R, a cube, or a cylinder) and positioning the user's view point (or virtual camera) within (e.g., at the starting point 1115) of the 3D model.

The electronic device 1101 may render a first video (or first screen) corresponding to a first view area 1121 within the 3D space 1105 according to a first gaze direction 1117 and display the first video (or first screen) on a display 1106.

The electronic device 1101 may render a second video (or second screen) corresponding to a second view area 1124 within the 3D space according to a gaze shift or rotation 1140, and display the second video (or second screen) on the display 1106.

The view area (or camera/user's FOV, display area, rendering view port, or rendering area) within the 3D space 1105 may be controlled by the horizontal FOV 1151 and vertical FOV 1152. The 3D application (or VR application) may set planes (e.g., right, left, top, bottom, near, and far planes) limiting/defining the rendering view port to control the FOVs.

Referring to FIG. 11B, the electronic device 1101 may display, on the display 1106, a first video portion 1131 corresponding to the first view area 1121 of an overall video 1130, e.g., a wide-angle video (or 360-degree video), such as a panorama. For example, as illustrated in FIG. 11C, the electronic device 1101 may display an image and/or video 1161 for the left eye corresponding to the first view area 1121 on at least part of a left half of the display 1106 and an image and/or video 1162 for the right eye corresponding to the first view area 1121 on at least part of a right half of the display 1106. Accordingly, the user may observe the first view area while feeling a depth.

The user may turn their head to the left while viewing the first view area 1121. Thus, the electronic device 1101 may sense the rotation 1140. Corresponding to the sensed rotation 1140, the electronic device 1101 may display the image and/or video 1171 for the left eye and the image and/or video 1172 for the right eye corresponding to the second video portion 1134, which is positioned relatively to the left, or its corresponding second view area 1124 of the whole video 1130. Accordingly, the user may observe the portion corresponding to the line of sight varied as he turns his head, allowing the user to receive a life-like service.

FIGS. 12A, 12B, 12C, 13A, 13B, 14A, and 14B illustrate a method for controlling a UAV according to an embodiment of the present disclosure.

Referring to FIG. 12A, a UAV 1201 may transmit a video representing an ambient space 1210 to a controller.

The reference/actual heading direction 1202 of the UAV 1201 may be represented as an azimuth on the horizontal surface 1212 that is parallel with the ground.

Referring to FIGS. 12A and 12B, the controller may display, through a display 1206, a first image and/or video of a first view area corresponding to the reference/actual heading direction 1202 of a 360-degree image and/or video 1220.

Referring to FIGS. 12B and 12C, the controller may display, through the display 1206, a second image and/or video of the second view area 1214 corresponding to the virtual heading direction 1222 in response to a first input.

Figure 13A:
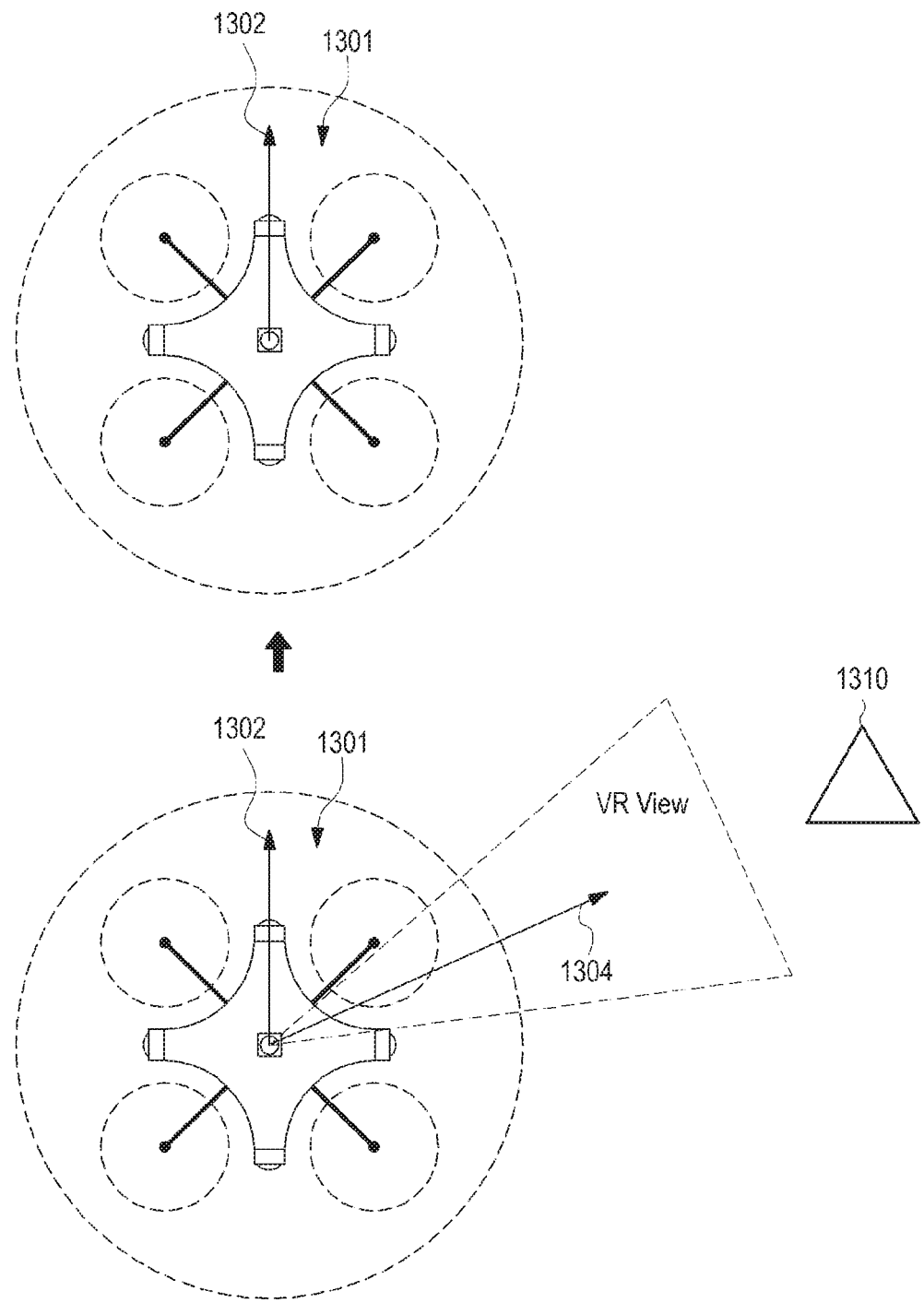
Figure 13B:
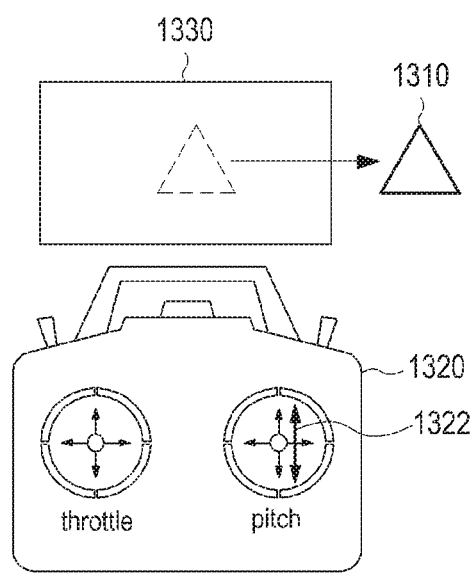

Referring to FIGS. 13A and 13B, in response to an input 1322 from the controller 1320 to move the UAV 1301 forward (or in the reference/actual heading direction), the UAV 1301 may advance in the reference/actual heading direction 1302.

As the UAV 1301 advances, an object 1310 may disappear from the display 1330 of the controller 1320.

To move the UAV 1301 towards the screen that the user is viewing or to track the object 1310, the user needs to move the UAV 1301 in the direction 1304 while being precisely aware of the azimuth of the object with respect to the reference/actual heading direction. In response to an input 1322 (or command to advance) from the controller 1320 to move the UAV 1301 forward, the UAV 1301 may advance in the reference/actual heading direction. As the yaw rotation of the UAV 1301 is slow, it may be difficult to immediately react to the VR head tracking speed or to track the object which randomly moves.

Figure 14A:
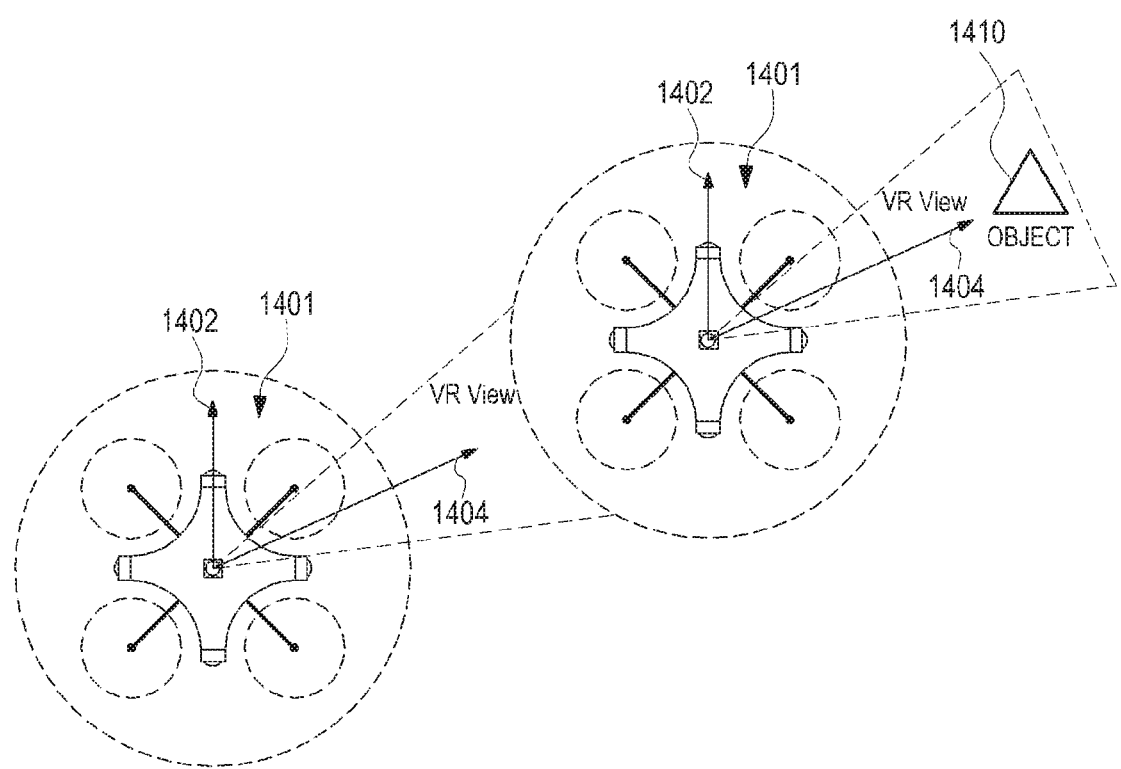
Figure 14B:
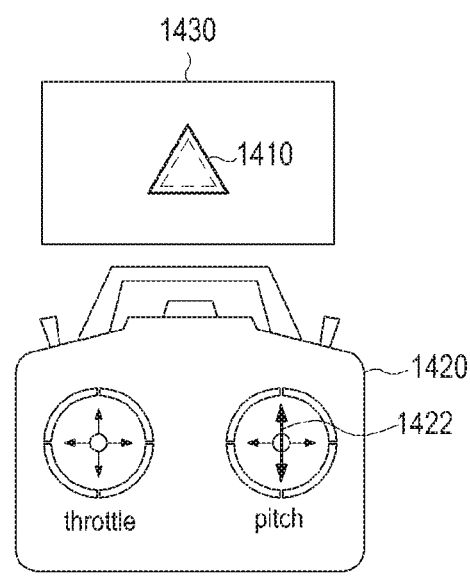

Referring to FIGS. 14A and 14B, in response to an input 1422 from the controller 1420 to move the UAV 1401 forward (or in the reference/actual heading direction 1402), the UAV 1401 may move in the virtual heading direction 1404.

As the UAV 1401 moves in the virtual heading direction 1404, the object 1410 displayed on the display 1430 of the controller 1420 may be enlarged.

Figure 15:
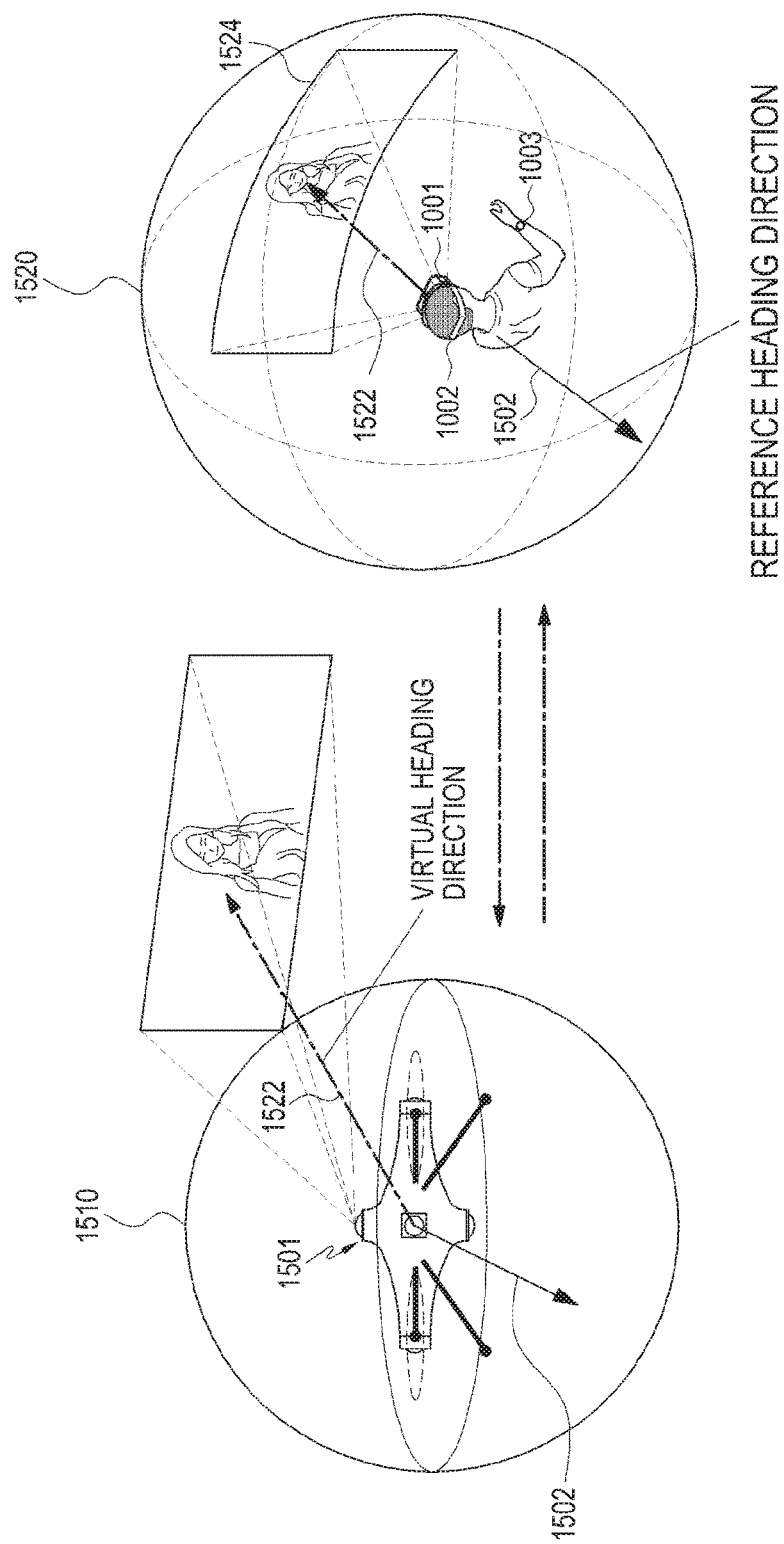
FIG. 15 illustrates a method for controlling a UAV according to an embodiment of the present disclosure.

FIG. 15 illustrates a method for controlling a UAV according to an embodiment of the present disclosure. A controller may include a first electronic device 1001, a second electronic device 1002, and a third electronic device 1003.

A UAV 1501 may transmit (or stream) a video representing an ambient space 1510 to a controller. For example, the UAV 1501 may stream the video to the first electronic device 1001 or the third electronic device 1003. The third electronic device 1003 may deliver the video received from the UAV 1501 to the first electronic device 1001. According to an embodiment of the present disclosure, the first electronic device 1001 and the second electronic device 1002 may be integrated in a single HMD VR device.

The first electronic device 1001 may provide a 3D space 1520 based on the video received from the UAV 1501. The first electronic device 1001 may display/identify a first video portion corresponding to the reference/actual heading direction 1502 (or current heading direction) of the UAV 1501 of the video.

In response to a first input, the first electronic device 1001 may display/identify a second video portion 1524 corresponding to the virtual heading direction 1522 of the UAV 1501 of the video received from the UAV 1501.

The first electronic device 1001 may in real-time transmit information about the virtual heading direction 1522 (e.g., the azimuth of the virtual heading direction 1522 with respect to the reference/actual heading direction 1502) to the UAV 1501.

The UAV 1501 may set its own virtual heading direction based on the received information about the virtual heading direction 1522. The virtual heading direction 1522 may be set as a 3D-directional heading or a 2D plane heading.

The third electronic device 1003 (or the first electronic device 1001) may generate a first control signal to move the UAV 1501 with respect to the virtual heading direction in response to a second input. The third electronic device 1003 or the first electronic device 1001 may transmit the first control signal to the UAV 1501.

For example, where the user inputs an advance command (or advance control signal) for approaching an object in the view direction (or virtual heading direction), the UAV 1501 may vary the control signal received from the third electronic device 1003 or first electronic device 1001 with respect to the virtual heading direction 1522, and the UAV 1501 may move according to the varied control signal. For example, when the object is positioned at a lower and right side, and the user issues an advance command through the third electronic device 1003 or the first electronic device 1001, the UAV 1501 may move to the lower and right side if it has been set as a 3D heading or to the right if it has been set as a 2D heading.

Figure 16A:
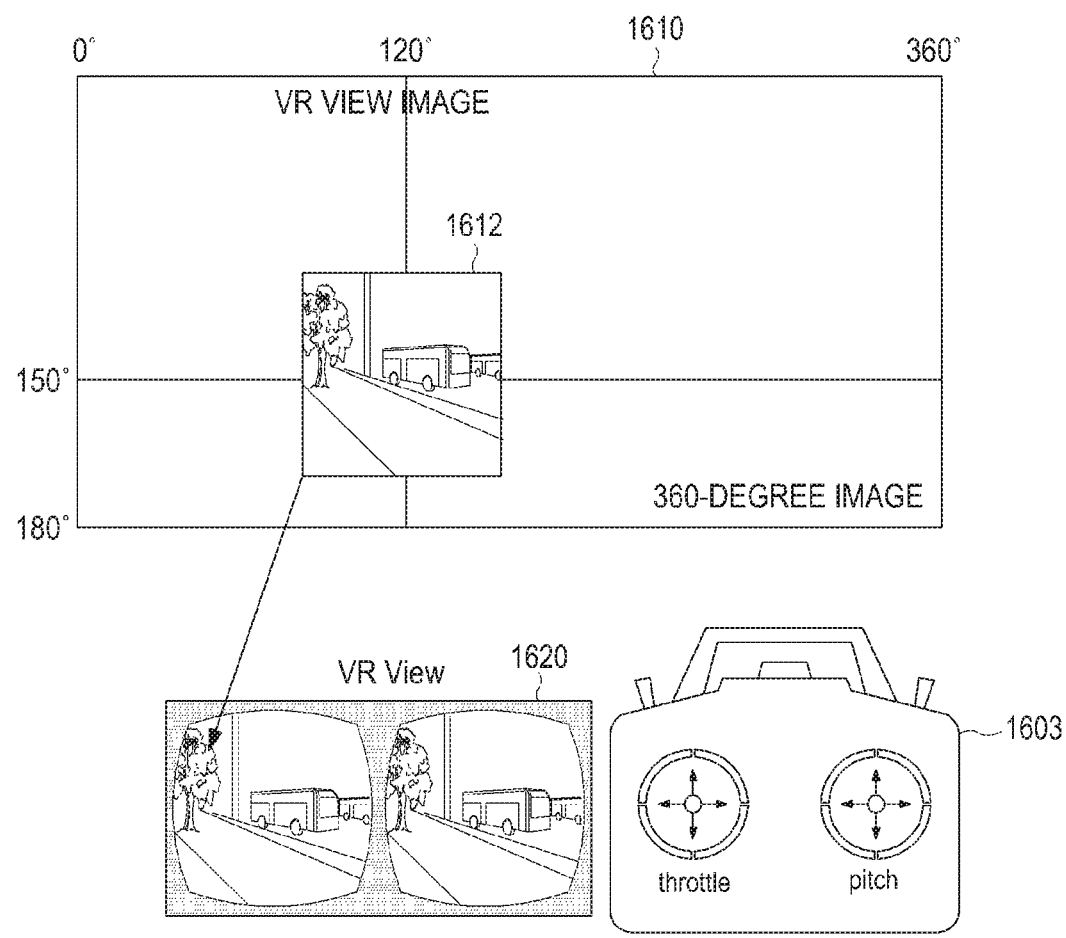
FIGS. 16A and 16B illustrate a method for controlling a UAV according to an embodiment of the present disclosure.
Figure 16B:
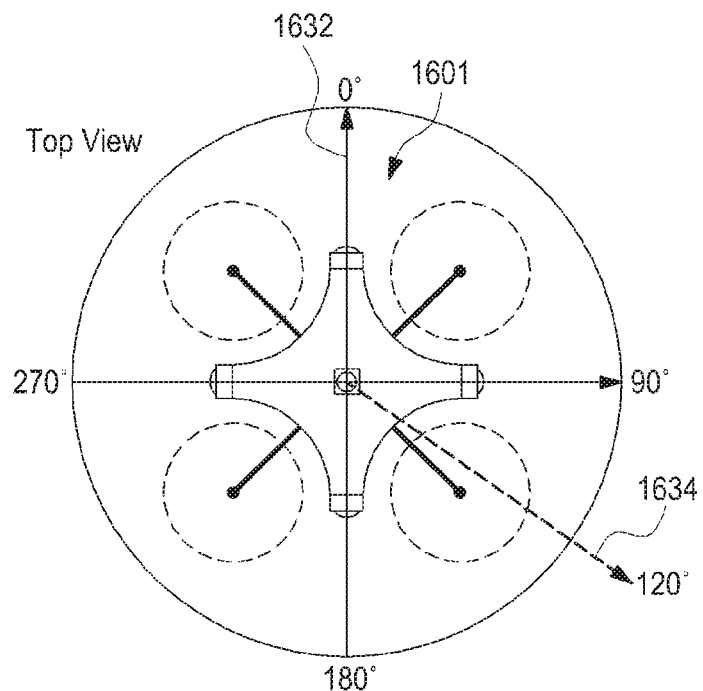
Figure 16B:
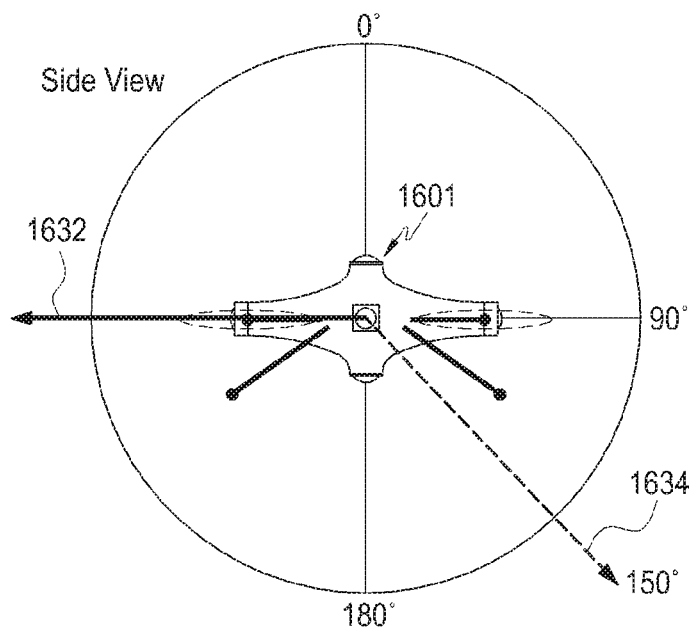

FIGS. 16A and 16B are views illustrating a method for controlling a UAV 1601 according to an embodiment of the present disclosure. A controller 1603 may include a VR device (e.g., the first electronic device 1001 or the second electronic device 1002) and a third electronic device 1620.

Referring to FIGS. 16A and 16B, a UAV 1601 may transmit (or stream) a video 1610 representing an ambient space to a controller. For example, the UAV 1601 may stream the video 1610 to the VR device.

The VR device may display an image and/or video for the left eye and an image and/or video for the right eye on the display of the third electronic device 1620.

In response to a first input, the VR device or third electronic device 1620 may display/identify a second video portion 1612 corresponding to the virtual heading direction 1634 of the UAV 1601 of the video 1610 received from the UAV 1601. The VR device or third electronic device 1620 may in real-time transmit information about the virtual heading direction 1634 (e.g., the azimuth of the virtual heading direction 1634 with respect to the reference/actual heading direction 1632) to the UAV 1501. For example, the virtual heading direction 1634 may be set as 120 degrees horizontally and 150 degrees vertically with respect to the reference heading direction 1632. The UAV 1601 may set its own virtual heading direction based on the received information about the virtual heading direction.

Figure 17A:
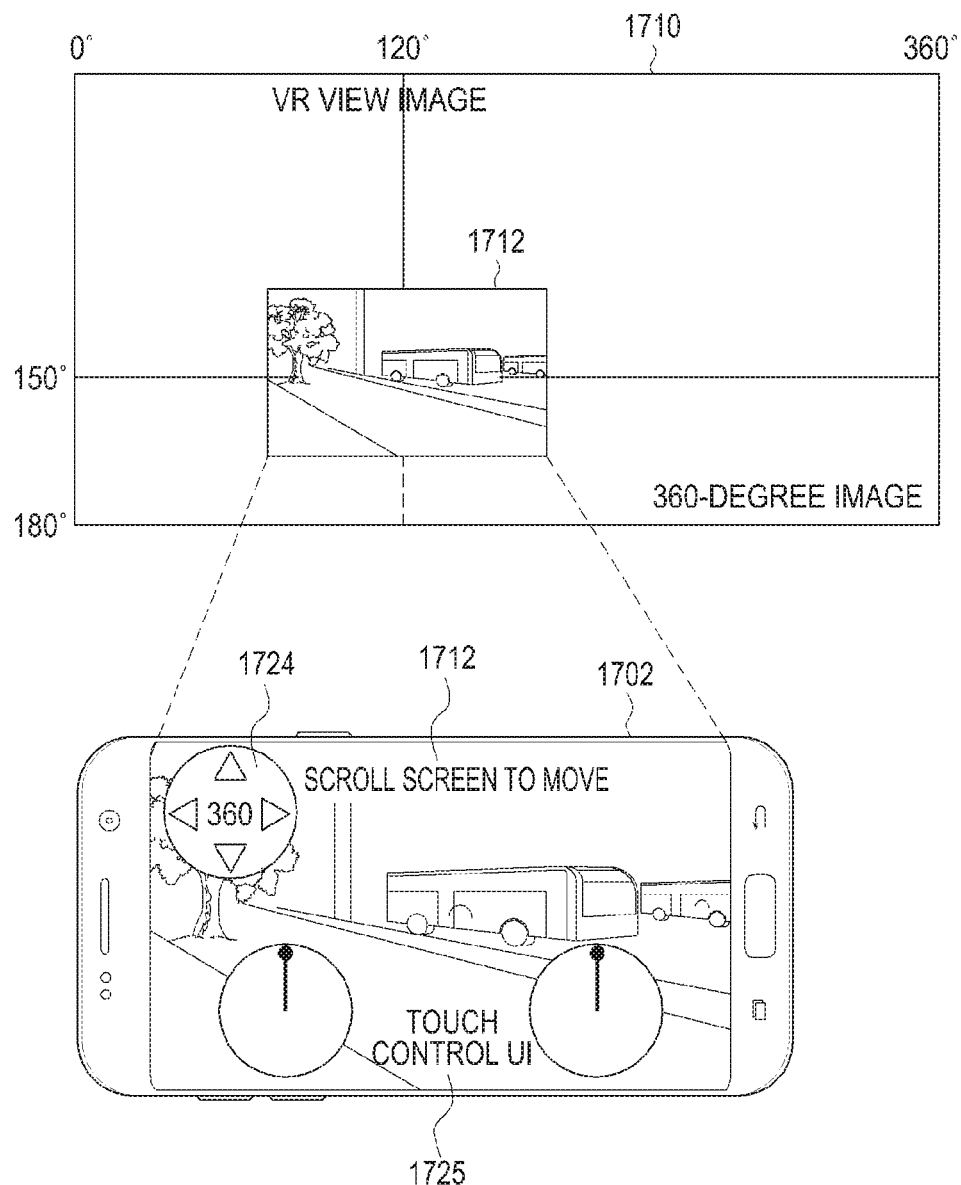
FIGS. 17A and 17B illustrate a method for controlling a UAV according to an embodiment of the present disclosure.
Figure 17B:
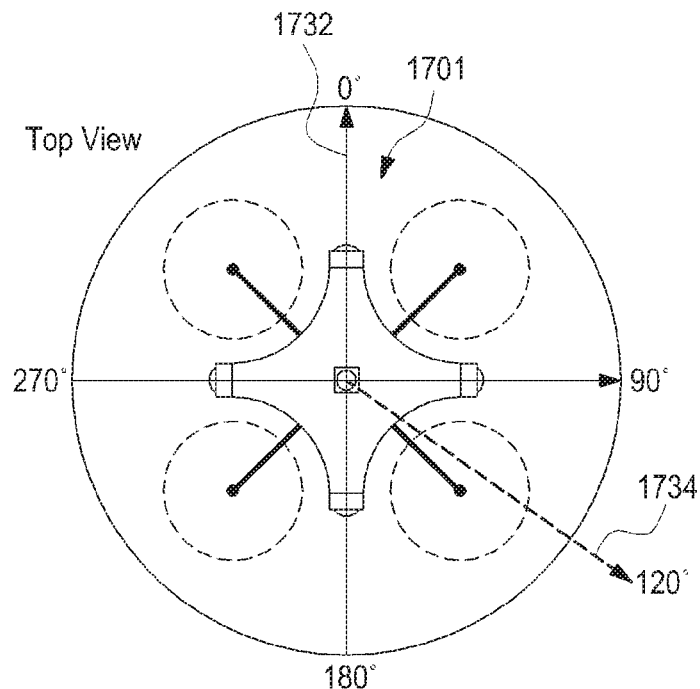
Figure 17B:
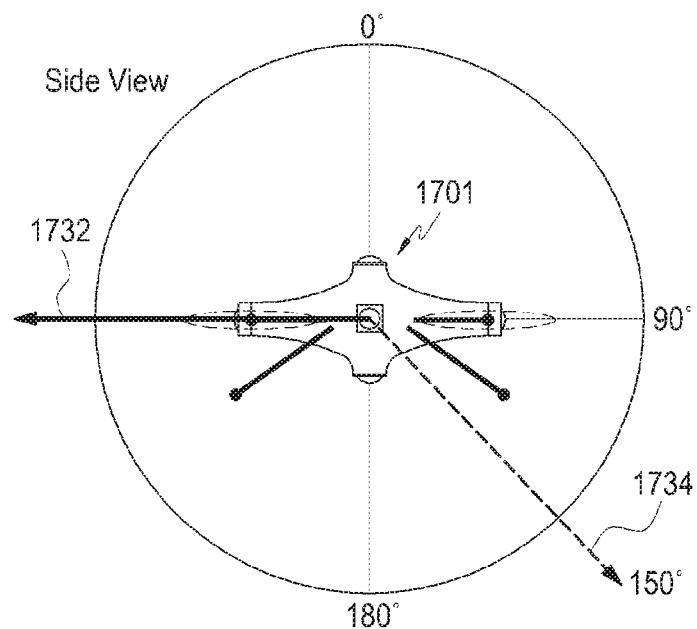

FIGS. 17A and 17B illustrate a method for controlling a UAV according to an embodiment of the present disclosure.

Referring to FIGS. 17A and 17B, a UAV 1701 may transmit (or stream) an image and/or video 1710 representing an ambient space to a controller 1702.

The controller 1702 may display an image and/or video 1710 transmitted from the UAV 1701 on the display. The controller 1702 may display a touch control UI 1725 for controlling the UAV 1701 on at least part of the display. The controller 1702 may display, on the display, a graphical element 1724 for scrolling the screen of the image and/or video 1710.

In response to a first input on the graphical element 1724, the controller 1702 may display/identify a second video portion 1712 corresponding to the virtual heading direction 1734 of the UAV 1701 of the video received from the UAV 1701. According to an embodiment of the present disclosure, the controller 1702 may, without displaying the graphical element 1724 on the display, display/identify a second video portion 1712 corresponding to the virtual heading direction 1734 of the UAV 1701 of the video received from the UAV 1701 based on a user input (e.g., a scroll) on at least part of the screen. The controller 1702 may in real-time transmit information about the virtual heading direction 1734 (e.g., the azimuth of the virtual heading direction 1734 with respect to the reference/actual heading direction 1732) to the UAV 1701. For example, the virtual heading direction 1734 may be set as 120 degrees horizontally and 150 degrees vertically with respect to the reference/actual heading direction 1732. The UAV 1701 may set its own virtual heading direction based on the received information about the virtual heading direction.

Figure 18:
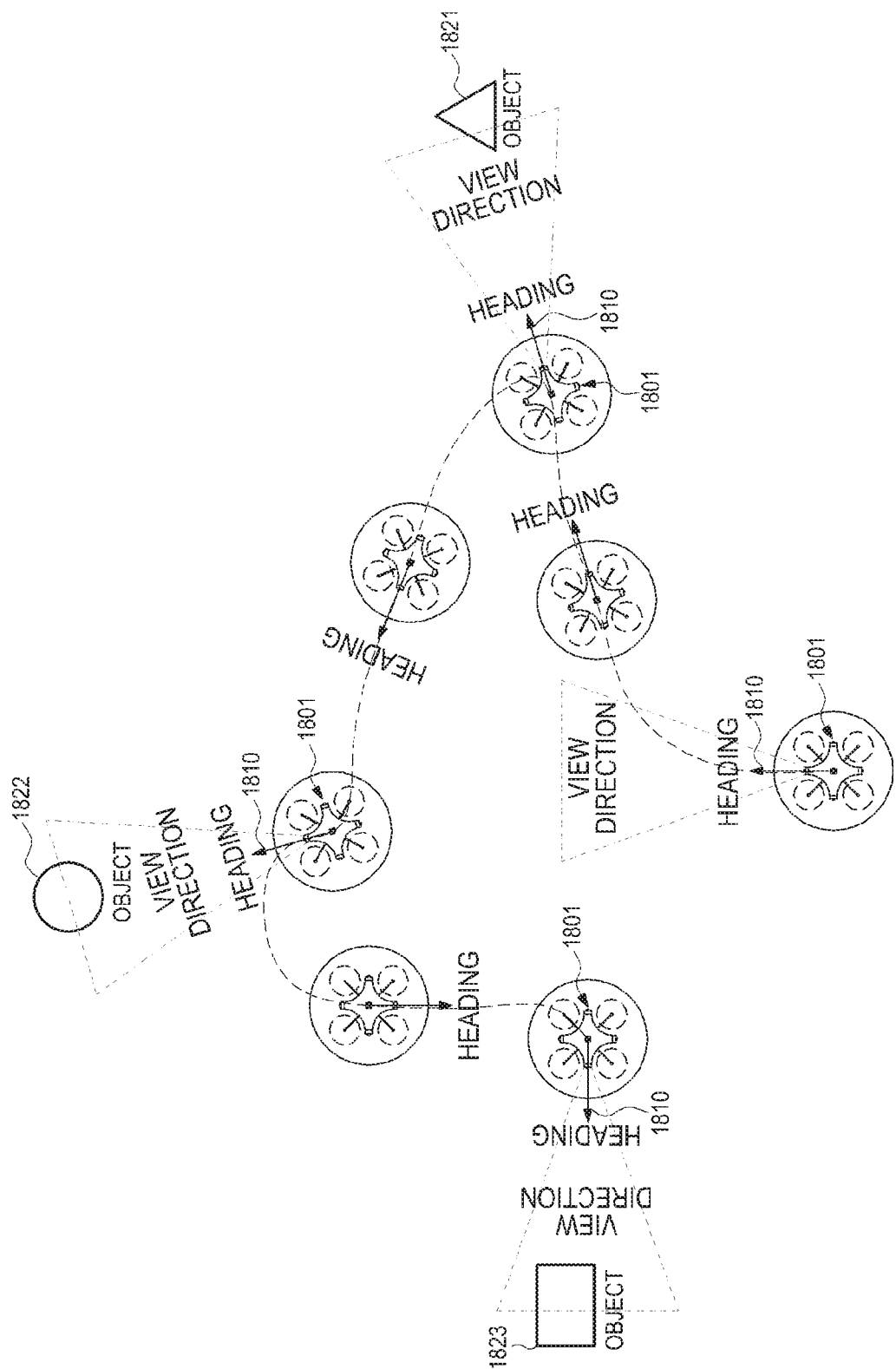
FIG. 18 illustrates a method for controlling a UAV according to an embodiment of the present disclosure.

FIG. 18 illustrates a method for controlling a UAV according to an embodiment of the present disclosure.

Referring to FIG. 18, to move the UAV 1801 towards the object that is viewed from the electronic device (e.g., the first electronic device 1001 or the second electronic device 1002), the reference/actual heading direction 1810 of the UAV 1801 may be rendered consistent with the view direction (or virtual heading direction), and an advance command (or advance control signal) may then be input.

In an example of continuously taking images of a first object 1821, a second object 1822, and a third object 1823, the user may turn the UAV 1801 so that the reference/actual heading direction 1810 faces the first object 1821 through a yaw rotation command and then move the UAV 1801 towards the first object 1821 through an advance command. Thereafter, the user may turn the UAV 1801 so that the reference/actual heading direction 1810 faces the second object 1822 through a yaw rotation command and then move the UAV 1801 towards the second object 1822 through an advance command. Thereafter, the user may turn (e.g., yaw-rotating) the UAV 1801 so that the reference/actual heading direction 1810 faces the third object 1823 through a yaw rotation command and then move the UAV 1801 towards the third object 1823 through an advance command.

In such case, the UAV 1801 may be difficult for a user to control. Further, rotating the UAV 1801 may be insufficient to respond to variations in the view direction (or virtual heading direction) of the electronic device (e.g., the controller or VR device) when moving quickly. Moreover, if the object is positioned in an upper or lower diagonal direction, the difficulty in the heading and altitude control of the UAV 1801 may increase. Such actual heading variation may result in unnecessary rotation of the UAV and a complicated flight route, therefore increasing power consumption.

Figure 19:
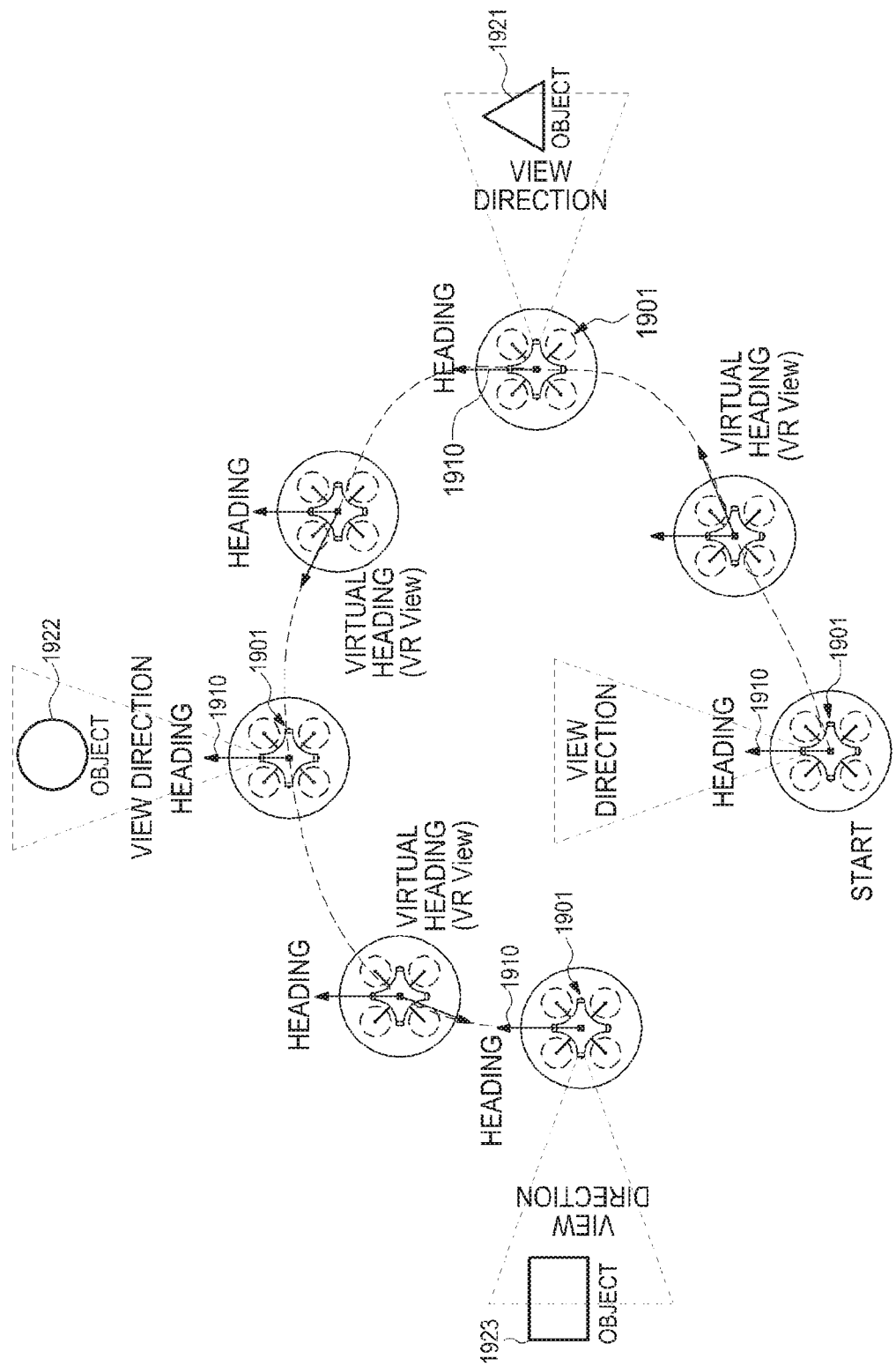
FIG. 19 illustrates a method for controlling a UAV according to an embodiment of the present disclosure.

FIG. 19 illustrates a method for controlling a UAV according to an embodiment of the present disclosure.

Referring to FIG. 19, a virtual heading direction may be set in real time or automatically in the view direction of an electronic device (e.g., the first electronic device 1001 or second electronic device 1002). For example, the user may move a UAV 1901 only with an advance input, and without changing the reference/actual heading direction 1910 to the direction of the object.

In an example of continuously taking images of a first object 1921, a second object 1922, and a third object 1923, the user may move (e.g., move to the right or roll-rotate to the right) the UAV 1901 through an advance command while maintaining the reference/actual heading direction 1910. Thereafter, the user may move (e.g., advance) the UAV 1901 towards the second object 1922 through an advance command while maintaining the reference/actual heading direction 1910. Thereafter, the user may move (e.g., move to the left or roll-rotate to the left) the UAV 1901 towards the third object 1923 through an advance command while maintaining the reference/actual heading direction 1910.

This way may minimize the flight route of the UAV 1901 and remove unnecessary rotation (or yaw rotation) of the UAV 1901, thereby allowing for optimal power use. According to an embodiment of the present disclosure, the electronic device (e.g., a VR device or controller), if interworking with automated hovering of the UAV 1901, may move the UAV without the need for rendering the view direction (e.g., the direction of display on the display) consistent with the heading direction of the UAV 1901, capturing omni-directional images and/or video.

Figure 20A:
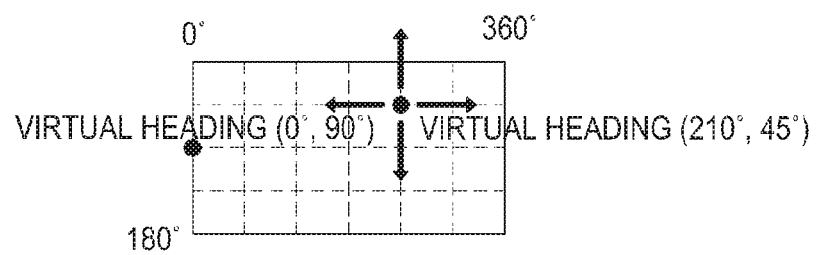
FIGS. 20A and 20B illustrate a method for controlling a UAV according to an embodiment of the present disclosure.
Figure 20B:
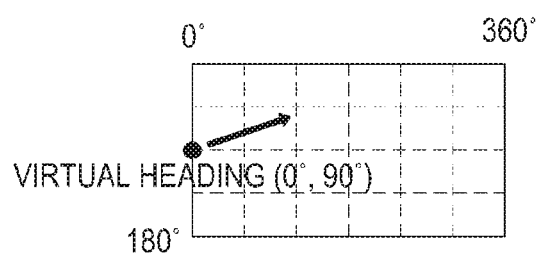

FIGS. 20A and 20B illustrate a method for controlling a UAV according to an embodiment of the present disclosure. In the graphs of FIGS. 20A and 20B, the horizontal axis refers to the horizontal azimuth of a UAV, and the vertical axis refers to the vertical azimuth of the UAV.

Referring to FIG. 20A, the UAV may transmit information about the reference/actual (or current) heading direction and video data representing an ambient space to a controller.

In response to a first input (e.g., screen control or moving the direction of VR), the controller may set a virtual heading direction of the UAV corresponding to a second video data portion of the video data received from the UAV.

In response to a second input (e.g., an input through a touch control UI or an input device of the controller), the controller may generate a first control signal to move the UAV with respect to the virtual heading direction.

The controller may transmit information about the virtual heading direction, together or separately from the first control signal, to the UAV.

The UAV may analyze the first control signal with respect to the virtual heading direction. For example, it is assumed that the reference/actual heading direction has a horizontal azimuth of 0 degrees and a vertical azimuth of 90 degrees and that the virtual heading direction has a horizontal azimuth of 210 degrees and a vertical azimuth of 45 degrees. Where the second input is an input (e.g., an advance command) to move the UAV forward, the first control signal may instruct the UAV to advance. The UAV may move in the virtual heading direction (e.g., 210 degrees and 45 degrees) while maintaining the heading direction (e.g., 0 degrees and 90 degrees) according to the first control signal.

Referring to FIG. 20B, in response to a second input, the controller may generate a first control signal to move the UAV with respect to the virtual heading direction.

The UAV may analyze the first control signal with respect to the reference heading direction. For example, it is assumed that the reference/actual heading direction has azimuths of 0 degrees and 90 degrees, and that the virtual heading direction has azimuths of 210 degrees and 45 degrees. Where the second input is (e.g., an advance command) to move the UAV forward, the first control signal may instruct to move in the virtual heading direction (210 degrees and 45 degrees) while maintaining the azimuths of 0 degrees and 90 degrees.

FIG. 20A may represent a scheme in which the controller transmits, to the UAV, the first control signal (e.g., an advance command) along with information about the virtual heading direction (e.g., 90 degrees with respect to the reference/actual heading direction (0 degrees). FIG. 20B may represent a scheme in which the controller calculates the first control signal (e.g., a command to move to the right) considering the virtual heading direction (e.g., 90 degrees with respect to the reference/actual heading direction (0 degrees) and then transmits the same.

In other words, in the scheme of FIG. 20A, the UAV may generate a final control signal based on the first control signal and the selected virtual heading direction, and in the scheme of FIG. 20B, the controller may generate a final first control signal based on the virtual heading direction and transmit a result to the UAV.

According to an embodiment of the present disclosure, the UAV may generate information about the reference/actual heading direction (or reference coordinates information) for the current position based on information obtained from at least one sensor (e.g., the GPS, a geo-magnetic sensor, or an acceleration sensor) or receive the reference/actual heading direction information from a server. The reference/actual heading direction information may be shared with the controller and utilized as information for control.

According to an embodiment of the present disclosure, an image and/or video captured by the UAV may be transmitted to the controller. The image and/or video may contain, or be mapped to, the reference/actual heading direction information (or reference coordinates information).

According to an embodiment of the present disclosure, the UAV and controller may sync in real time the reference/actual heading direction information (or reference coordinates information), and the UAV may transmit an image and/or video configured with respect to the reference/actual heading direction information to the controller.

According to an embodiment of the present disclosure, the reference/actual heading direction information may be displayed in the image and/or video displayed by the controller or transmitted by the UAV.

Figure 21:
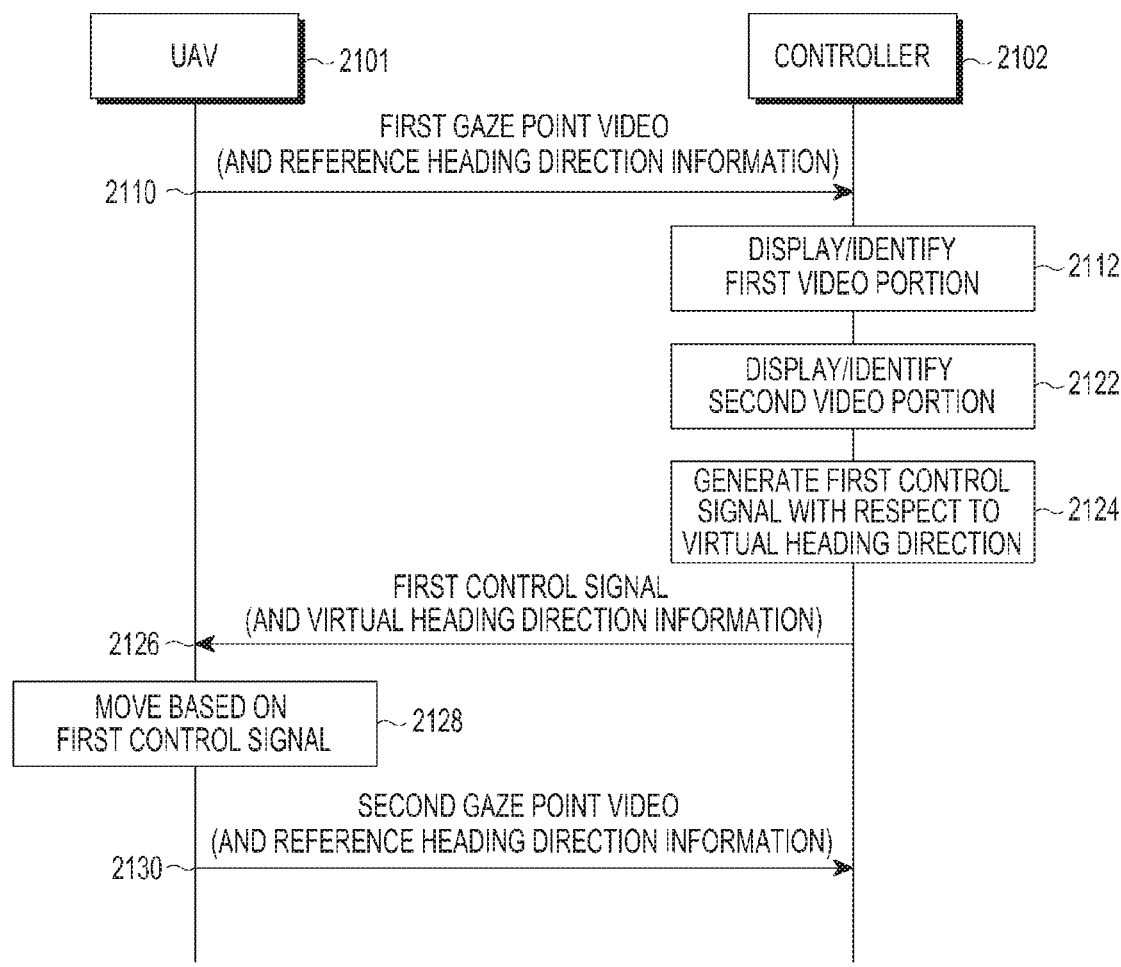
FIG. 21 is a flowchart illustrating a method for controlling a UAV according to an embodiment of the present disclosure.

FIG. 21 is a flowchart illustrating a method for controlling a UAV according to an embodiment of the present disclosure. The control method may include steps 2110 to 2130. The control method may be performed by a UAV 2101 and a controller 2102, or the processors of UAV 2101 and controller 2102, respectively.

In step 2110, the UAV 2101 may transmit, to the controller 2102, video data in a first gaze point (or a first camera view point), e.g., a video captured in the first gaze point.

The controller 2102 may transmit, to the UAV 2101, a third control signal to indicate the start of image capturing in response to a fourth input. The UAV 2101 may start to capture an ambient space in response to the third control signal and transmit, to the controller 2102, video data in the first gaze point obtained by capturing the ambient space of the UAV 2101.

The UAV 2101 may in real time transmit the video data obtained by capturing the ambient space to the controller 2102.

The UAV 2101 may transmit the video data (e.g., 360-degree video or panoramic video) representing the ambient space to the controller 2102.

The UAV 2101 may transmit information about the reference/actual (or current) heading direction, together or separately from the first gaze-point video data, to the controller 2102.

The controller 2102 may obtain information about the reference/actual heading direction from the first gaze-point video data.

In step 2112, the controller 2102 may display/identify a first video data portion corresponding to the reference/actual heading direction of the UAV 2101 of the first gaze-point video data received from the UAV 2101. The controller 2102 may display and/or identify the first video data portion corresponding to the reference/actual heading direction in response to an input or automatically.

In step 2122, the controller 2102 may display or identify a second video data portion corresponding to an actual heading direction of the UAV 2101 of the first gaze-point video data received from the UAV 2101 in response to a first input. For example, the controller 2102 may detect the first input on the first gaze-point video data.

For example, the first input may include at least one of a preset touch/hovering gesture (e.g., at least one of a swipe gesture, drag gesture, or scroll) on the display, selection of a graphical element displayed on the display, a voice command, or a motion input.

In step 2124, the controller 2102 may generate a first control signal to move the UAV 2101 with respect to the virtual heading direction in response to a second input.

The controller 2102 may detect the second input on a control UI, the second video data portion, or second gaze-point video data.

The second input may include at least one of a preset touch/hovering gesture (e.g., at least one of a swipe gesture, drag gesture, or scroll) on the display, selection of a graphical element displayed on the display, a voice command, or a motion input.

In step 2126, the controller 2102 may transmit a first control signal to the UAV 2101.

The controller 2102 may transmit information about the virtual heading direction, together or separately from the first control signal, to the UAV 2101.

In step 2128, the UAV 2101 may move from the first gaze point to a second gaze point based on the first control signal.

For example, it is assumed that the reference/actual heading direction has a horizontal azimuth of 0 degrees and a vertical azimuth of 90 degrees and that the virtual heading direction has a horizontal azimuth of 90 degrees and a vertical azimuth of 90 degrees. Where the second input is an input to move the UAV 2101 forward, the first control signal may instruct the UAV 2101 to move forward. The UAV may move in the direction of (90 degrees, 90 degrees) while maintaining the heading direction (e.g., 0 degrees and 90 degrees) according to the first control signal and the reference/actual heading direction.

In step 2130, the UAV 2101 may transmit, to the controller 2102, video data in the second gaze point (or a second camera view point), e.g., a video captured in the second gaze point.

The UAV 2101 may transmit information about the reference/actual heading direction, together or separately from the second gaze-point video data, to the controller 2102.

Figure 22:
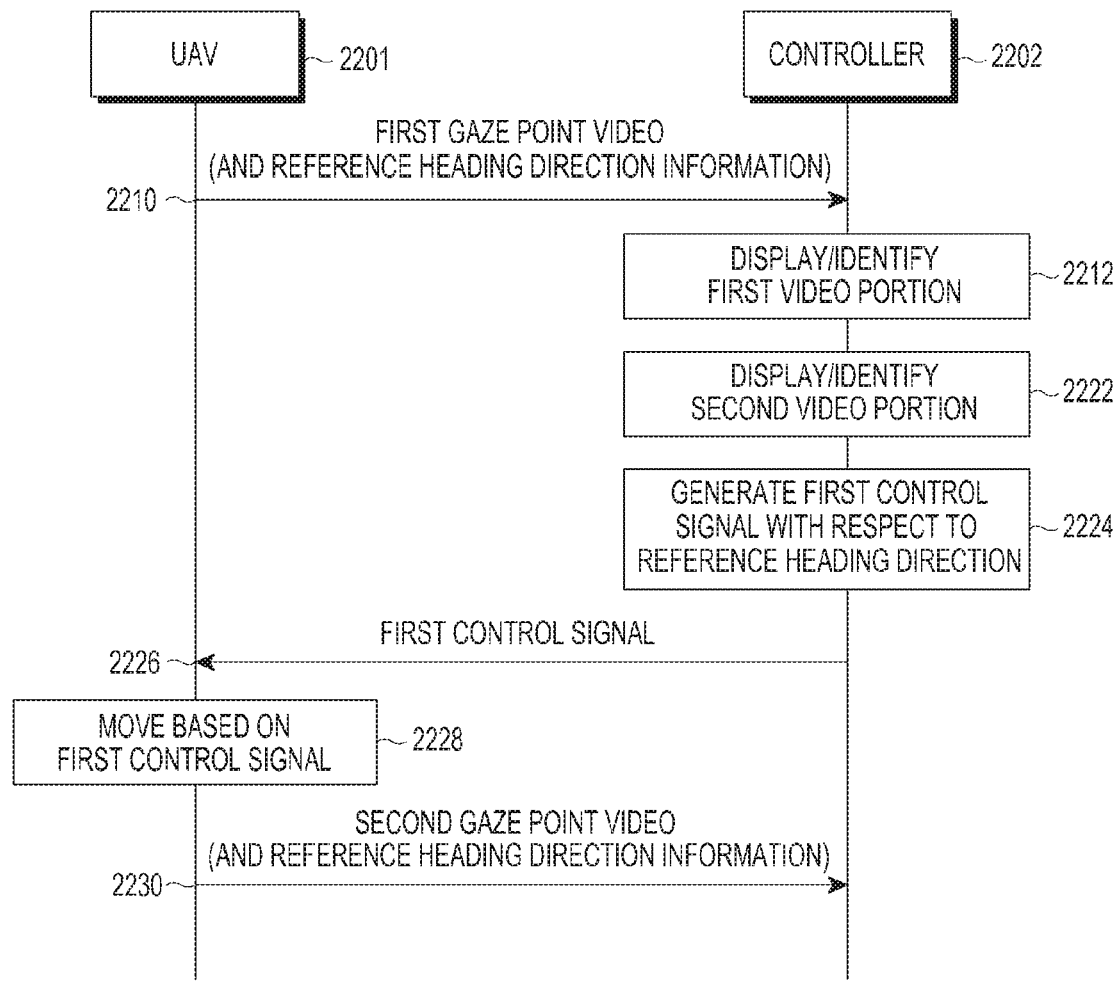
FIG. 22 is a flowchart illustrating a method for controlling a UAV according to an embodiment of the present disclosure.

FIG. 22 is a flowchart illustrating a method for controlling a UAV according to an embodiment of the present disclosure. The control method may include steps 2210 to 2230. The control method may be performed by a UAV 2201 and a controller 2202, or the processors of UAV 2201 and controller 2202, respectively. In step 2210, the UAV 2201 may transmit, to the controller 2202, video data in a first gaze point (or a first camera view point), e.g., a video captured in the first gaze point.

The controller 2202 may transmit, to the UAV 2201, a third control signal to indicate the start of image capturing in response to a fourth input. The UAV 2201 may start to capture an ambient space in response to the third control signal and transmit, to the controller 2202, video data in the first gaze point obtained by capturing the ambient space of the UAV 2201.

The UAV 2201 may in real time transmit the video data obtained by capturing the ambient space to the controller 2202.

The UAV 2201 may transmit the video data (e.g., 360-degree video or panoramic video) representing the ambient space to the controller 2202.

The UAV 2201 may transmit information about the reference/actual (or current) heading direction, together or separately from the first gaze-point video data, to the controller 2202.

The controller 2202 may obtain information about the reference/actual heading direction from the first gaze-point video data.

In step 2212, the controller 2202 may display/identify a first video data portion corresponding to the reference/actual heading direction of the UAV 2201 of the first gaze-point video data received from the UAV 2201. The controller 2202 may display and/or identify the first video data portion corresponding to the reference/actual heading direction in response to an input or automatically.

In step 2222, the controller 2202 may display or identify a second video data portion corresponding to an actual heading direction of the UAV 2201 of the first gaze-point video data received from the UAV 2201 in response to a first input. For example, the controller 2202 may detect the first input on the first gaze-point video data.

The first input may include at least one of a preset touch/hovering gesture (e.g., at least one of a swipe gesture, drag gesture, or scroll) on the display, selection of a graphical element displayed on the display, a voice command, or a motion input.

In step 2224, the controller 2202 may generate a first control signal to move the UAV 2201 with respect to the reference/actual heading direction in response to a second input.

The controller 2202 may detect the second input on a control UI, the first video portion, or first gaze-point video.

The second input may include at least one of a preset touch/hovering gesture (e.g., at least one of a swipe gesture, drag gesture, or scroll) on the display, selection of a graphical element displayed on the display, a voice command, or a motion input.

In step 2226, the controller 2202 may transmit a first control signal to the UAV 2201.

The controller 2202 may transmit information about the virtual heading direction, together or separately from the first control signal, to the UAV 2201.

In step 2228, the UAV 2201 may move from the first gaze point to a second gaze point based on the first control signal.

For example, it is assumed that the reference/actual heading direction has a horizontal azimuth of 0 degrees and a vertical azimuth of 90 degrees and that the virtual heading direction has a horizontal azimuth of 90 degrees and a vertical azimuth of 90 degrees. Where the second input is an input to move the UAV 2201 forward, the first control signal may instruct the UAV 2201 to move to the right. The UAV may move in the direction of (90 degrees, 90 degrees) while maintaining the heading direction (e.g., 0 degrees and 90 degrees) according to the first control signal.

In step 2230, the UAV 2201 may transmit, to the controller 2202, video data in the second gaze point (or a second camera view point), e.g., a video captured in the second gaze point.

The UAV 2201 may transmit information about the reference/actual heading direction, together or separately from the second gaze-point video data, to the controller 2202.

Figure 23:
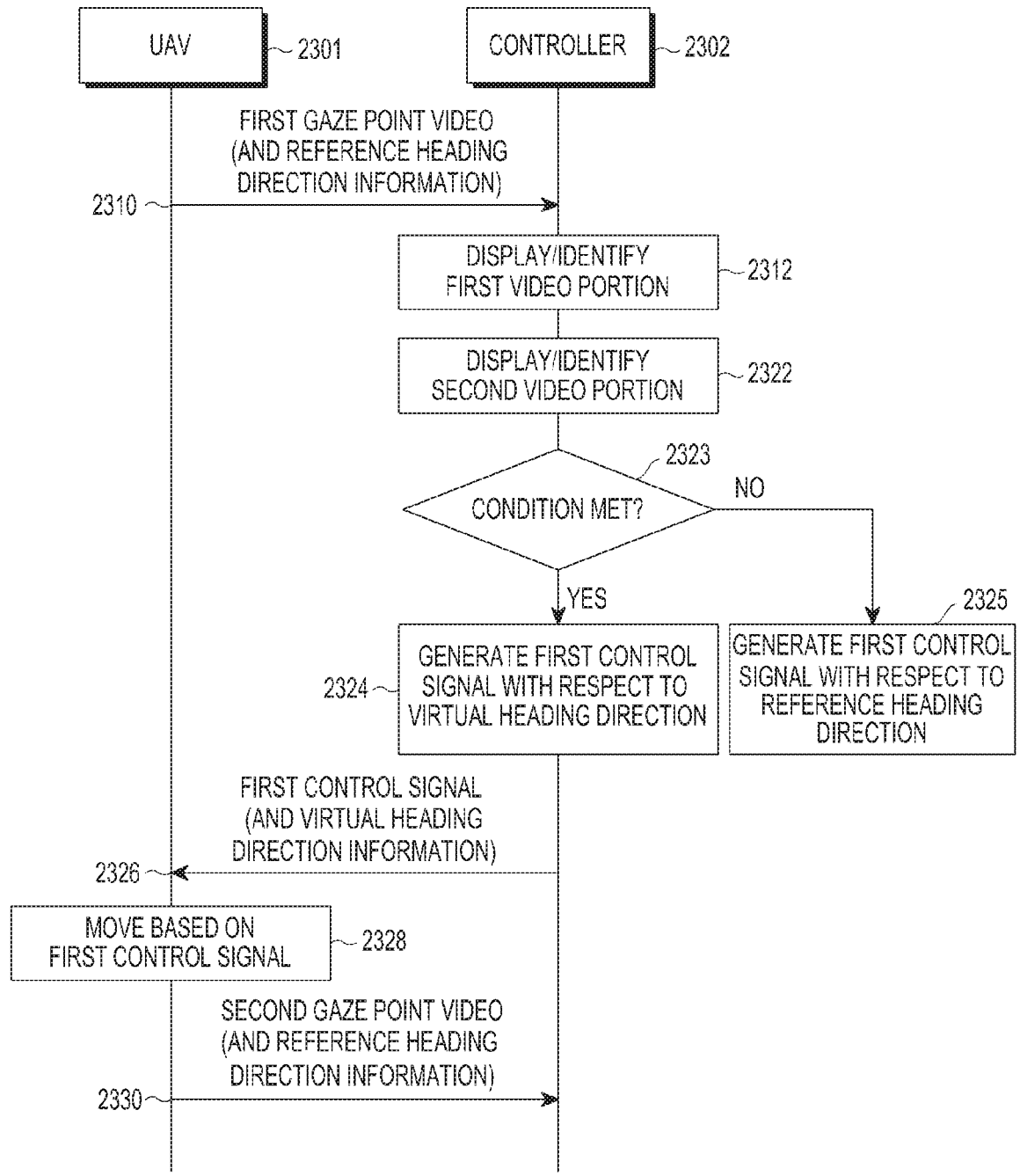
FIG. 23 is a flowchart illustrating a method for controlling a UAV according to an embodiment of the present disclosure.

FIG. 23 is a flowchart illustrating a method for controlling a UAV according to an embodiment of the present disclosure. The control method may include steps 2310 to 2330. The control method may be performed by a UAV 2301 and a controller 2302, or the processors of UAV 2301 and controller 2302, respectively.

In step 2310, the UAV 2301 may transmit, to the controller 2302, video data in a first gaze point (or a first camera view point), e.g., a video captured in the first gaze point.

The controller 2302 may transmit, to the UAV 2301, a third control signal to indicate the start of image capturing in response to a fourth input. The UAV 2301 may start to capture an ambient space in response to the third control signal and transmit, to the controller 2302, a video in the first gaze point obtained by capturing the ambient space of the UAV 2301.

The UAV 2301 may in real time transmit the video obtained by capturing the ambient space to the controller 2302.

The UAV 2301 may transmit the video (e.g., 360-degree video or panoramic video) representing the ambient space to the controller 2302.

The UAV 2301 may transmit information about the reference/actual (or current) heading direction, together or separately from the first gaze-point video, to the controller 2302.

The controller 2302 may obtain information about the reference/actual heading direction from the first gaze-point video.

In step 2312, the controller 2302 may display/identify a first video data portion corresponding to the reference/actual heading direction of the UAV 2301 of the first gaze-point video data received from the UAV 2301. The controller 2302 may display and/or identify the first video data portion corresponding to the reference/actual heading direction in response to an input or automatically.

In step 2322, the controller 2302 may display or identify a second video data portion corresponding to an actual heading direction of the UAV 2301 of the first gaze-point video data received from the UAV 2301 in response to a first input. For example, the controller 2302 may detect the first input on the first gaze-point video data.

For example, the first input may include at least one of a preset touch/hovering gesture (e.g., at least one of a swipe gesture, drag gesture, or scroll) on the display, selection of a graphical element displayed on the display, a voice command, or a motion input.

In step 2323, the controller 2302 may determine whether a preset condition is met.

The controller 2302 may perform step 2324 when the preset condition is met and perform step 2325 when the preset condition is not met. For example, the preset condition may be to determine whether the first control signal needs to generate with respect to the virtual heading direction.

According to an embodiment of the present disclosure, the processor of the controller 2302 may determine that the condition is met upon detecting any one of a motion of the electronic device/user, a motion of the user's gaze, a motion of the view area (or a virtual camera/user field of view within the 3D space), or an input/gesture of a preset type/pattern/text. The electronic device may receive an input that meets the condition from an external device (e.g., the first external electronic device 102, the second external electronic device 104, or an accessory/peripheral device (e.g., a data glove worn on a hand, a joystick, or a mouse)).

The electronic device may detect a motion of the electronic device, the user, or the user's line of sight using at least one sensor of an acceleration sensor 240E that senses a speed variation, a gyro sensor 240B that senses a tilt and rotation, or an eye tracker 240I that follows the user's line of sight.

The eye tracker may include an IR camera and two light sources. The two light sources may generate two reflection points on the surface of the corneas of the user's eyes. The eye tracker may follow the line of sight using the center of the two reflection points and the central point of the pupils.

The eye tracker may generate sampling information about the position of the line of sight of, e.g., 100*100 (width*height).

The user's motion may be detected through head tracking, position tracking, or camera-based hand gesture recognition.

In step 2324, the controller 2302 may generate a first control signal to move the UAV 2301 with respect to the virtual heading direction in response to a first input.

The controller 2302 may detect the second input on a control UI, the first video data portion, or first gaze-point video data.

The second input may include at least one of a preset touch/hovering gesture (e.g., at least one of a swipe gesture, drag gesture, or scroll) on the display, selection of a graphical element displayed on the display, a voice command, or a motion input.

In step 2325, the controller 3202 may generate a first control signal to move the UAV 2301 with respect to the reference/actual heading direction in response to a second input.

In step 2326, the controller 2302 may transmit a first control signal to the UAV 2301.

The controller 2302 may transmit information about the virtual heading direction, together or separately from the first control signal, to the UAV 2301.

In step 2328, the UAV 2301 may move from the first gaze point to a second gaze point based on the first control signal.

For example, it is assumed that the reference/actual heading direction has azimuths of 0 degrees and 90 degrees and that the virtual heading direction has azimuths of 90 degrees and 90 degrees. Where the second input is an input to move the UAV 2301 forward, the first control signal may instruct the UAV 2301 to move forward or to the right. The UAV may move in the direction of (90 degrees, 90 degrees) while maintaining the heading direction (e.g., 0 degrees and 90 degrees) according to the first control signal and the reference/actual heading direction.

In step 2330, the UAV 2301 may transmit, to the controller 2302, video data in the second gaze point (or a second camera view point), e.g., a video captured in the second gaze point.

The UAV 2301 may transmit information about the reference/actual heading direction, together or separately from the second gaze-point video data, to the controller 2302.

Figure 24:
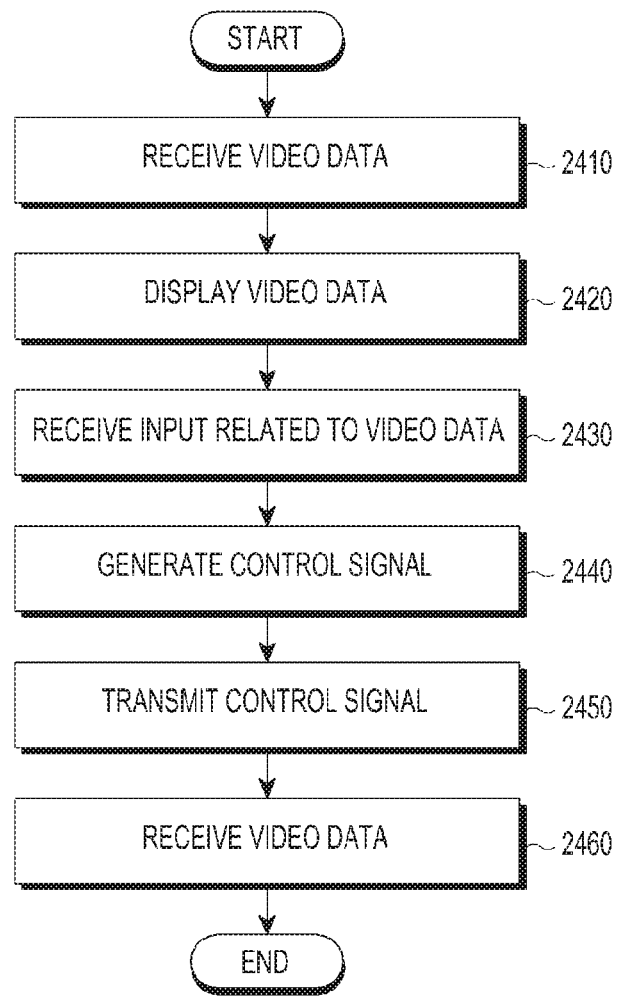
FIG. 24 is a flowchart illustrating a method for controlling a UAV according to an embodiment of the present disclosure.

FIG. 24 is a flowchart illustrating a method for controlling a UAV according to an embodiment of the present disclosure. The control method may include steps 2410 to 2460. The control method may be performed by an electronic device controlling a UAV, or a processor of the electronic device.

In step 2410, the electronic device may receive video data (e.g., a 360-degree video or panoramic video) captured by an omni-directional camera of the UAV through a wireless communication circuit of the electronic device while the UAV faces in the first direction.

The UAV may transmit information about the reference/actual (or current) heading direction, together or separately from the video data, to the electronic device.

The electronic device may obtain information about the reference/actual heading direction from the first gaze-point video data.

In step 2420, the electronic device may display the video on a display based on at least part of the video data.

In step 2430, the electronic device may receive an input related to the video data.

The electronic device may receive an input to select an area or object on the video which is positioned in a second direction different from the first direction.

The electronic device may receive at least one of a preset touch/hovering gesture (e.g., at least one of a swipe gesture, drag gesture, or scroll) on the display, selection of a graphical element displayed on the display, a voice command, or a motion input.

In step 2440, the electronic device may generate a control signal configured to indicate the second direction and to fly in the second direction without rotating the UAV in response to an input.

In step 2450, the electronic device may transmit the control signal generated through the wireless communication circuit to the UAV.

In step 2460, while the UAV faces in the second direction, the electronic device may receive, from the UAV through the wireless communication circuit, the video data captured by the omni-directional cameras of the UAV.

The electronic device may display the video on the display based on at least part of the video data captured while the UAV faces in the second direction.

Figure 25:
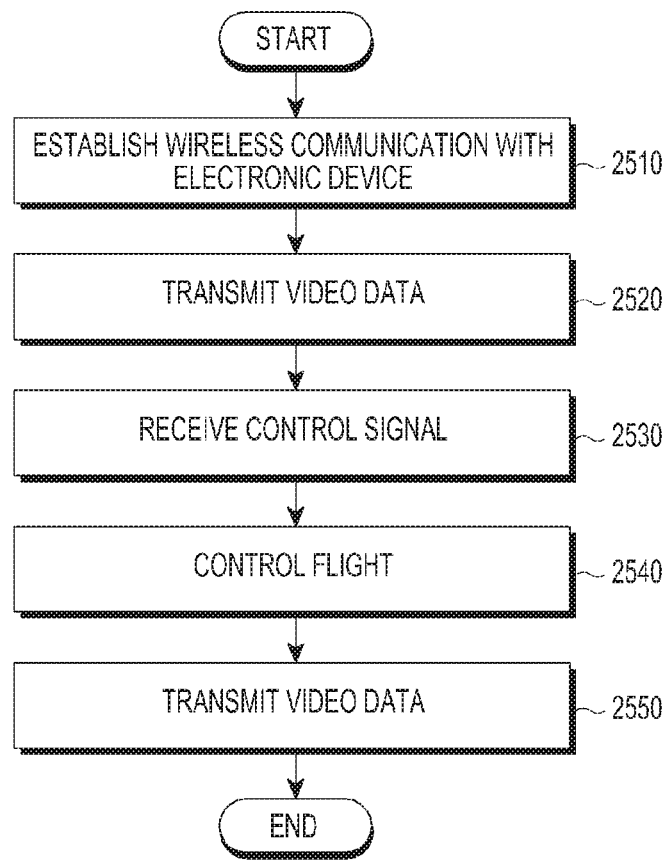
FIG. 25 is a flowchart illustrating a method for operating a UAV according to an embodiment of the present disclosure.

FIG. 25 is a flowchart illustrating a method for operating a UAV according to an embodiment of the present disclosure. The operation method may include steps 2510 to 2550. The operation method may be performed a UAV that is controlled by an electronic device, or a processor of the UAV.

In step 2510, the UAV may establish communication with the electronic device by way of a wireless communication circuit.

In step 2520, while the UAV faces in the first direction, the UAV may transmit video data captured by the omni-directional cameras through the wireless communication circuit to the electronic device.

The UAV may transmit information about the reference/actual (or current) heading direction, together or separately from the video data, to the electronic device.

In step 2530, the UAV may receive a control signal indicating a second direction different from the first direction through the wireless communication circuit.

The control signal may be configured to indicate the second direction and to fly the UAV in the second direction without rotation.

In step 2540, the UAV may fly in the second direction without rotation under the control of a navigation circuit.

In step 2550, while the UAV faces in the second direction, the UAV may transmit the video data captured by the omni-directional cameras through the wireless communication circuit to the electronic device.

As used herein, the term "module" includes a unit configured in hardware, software, or firmware, and may interchangeably be used with other terms, e.g., "logic", "logic block", "part", or "circuit". The module may be a single integral part, or a minimum unit or a part of performing one or more functions. The module may be implemented mechanically or electronically and may include, e.g., an application specific integrated circuit (ASIC) chip, a field programmable gate arrays (FPGAs), or a programmable logic device, that are known or are to be developed in the future, for performing certain operations.

According to an embodiment of the present disclosure, at least a part of the device (e.g., modules or their functions) or method (e.g., operations) may be implemented as instructions stored in a computer-readable storage medium, e.g., in the form of a program module. The instructions, when executed by a processor, may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM), DVD, magnetic-optical medium (e.g., floptical disk), or an embedded memory. The instruction may include a code created by a compiler or a code executable by an interpreter.

Modules or programming modules in accordance with various embodiments of the present disclosure may include at least one or more of the aforementioned components, omit some of the components, or further include additional components. Operations performed by modules, programming modules, or other components may be carried out sequentially, in parallel, repeatedly, or in a heuristic manner, or at least some operations may be executed in a different order or omitted or other operations may be added.

According to an embodiment of the present disclosure, there may be provided a storage medium storing commands configured to be executed by at least one processor to enable the at least one processor to perform at least one operation, the at least one operation comprising displaying a first video portion corresponding to a reference heading direction of a UAV of a video captured by the UAV, displaying a second video portion corresponding to a virtual heading direction of the video in response to a first input, and in response to a second input, generating a first control signal to move the UAV with respect to the virtual heading direction and transmitting the generated first control signal to the UAV.

According to various embodiments of the present disclosure, a UAV with omni-directional cameras may be controlled in the direction that the user is viewing through a VR or display device omni-directional, images captured and streamed by the UAV, allowing for intuitive control of the UAV and 360-degree imaging.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure, as defined by the appended claims and their equivalents.

What is claimed is:

1. An electronic device, comprising:
a housing;
a display mounted on the housing;
a wireless communication circuit configured to establish wireless communication with an unmanned aerial vehicle (UAV) including an omni-directional camera;
at least one sensor disposed in the housing and configured to detect an orientation of the display;
a processor disposed in the housing and electrically connected with the display, the wireless communication circuit, and the at least one sensor; and
a memory disposed in the housing and electrically connected with the processor, wherein the memory stores instructions, which when executed, enable the processor to:
receive video data captured by the omni-directional camera of the UAV through the wireless communication circuit while the UAV faces in a first direction,
display a video on the display based on at least part of the video data,
receive an input to select an area or object on the video positioned in a second direction different from the first direction, transmit to the UAV a control signal configured to indicate the second direction and to cause the UAV to fly without rotation in the second direction through the wireless communication circuit in response to the input, and receive from the UAV the video data captured by the omni-directional camera of the UAV through the wireless communication circuit while the UAV faces in the second direction.

2. The electronic device of claim 1, wherein the memory further stores instructions to enable the processor to receive a first input to select the area or object on the video through the display, and receive a second input to move the UAV in the second direction through the display.

3. An electronic device, comprising:
a display;
a wireless communication circuit configured to transmit or receive data;
a processor; and
a memory electrically connected with the processor,
wherein the memory stores instructions, which when executed, enable the processor to:
display a first video portion corresponding to a reference heading direction of an unmanned aerial vehicle (UAV) of a video captured by the UAV,
display a second video portion corresponding to a virtual heading direction of the video in response to a first input, and
generate a first control signal, in response to a second input, to cause the UAV to move with respect to the virtual heading direction, and
transmit the generated first control signal through the wireless communication circuit to the UAV.

4. The electronic device of claim 3, wherein the memory further stores instructions to enable the processor to, in response to a third input, generate a second control signal to cause the UAV to move with respect to the reference heading direction, and transmit the generated second control signal to the UAV.

5. The electronic device of claim 4, wherein the second input and the third input indicate a same motion, the second control signal indicates a motion in a first direction, and the first control signal indicates a combination of the motion in the first direction and a motion in a second direction.

6. The electronic device of claim 3, wherein the first control signal is configured to enable the UAV to maintain the reference heading direction after moving the UAV.

7. A storage medium storing commands, the commands configured to be executed by at least one processor to enable the at least one processor to perform at least one operation, the at least one operation comprising:
displaying a first video portion corresponding to a reference heading direction of an unmanned aerial vehicle (UAV) of a video captured by the UAV;
displaying a second video portion corresponding to a virtual heading direction of the video in response to a first input; and
generating a first control signal, in response to a second input, to cause the UAV to move with respect to the virtual heading direction, and
transmitting the generated first control signal to the UAV.

8. The storage medium of claim 7, wherein the at least one operation further comprises generating a second control signal, in response to a third input, to cause the UAV to move with respect to the reference heading direction, and transmitting the generated second control signal to the UAV.

9. The storage medium of claim 8, wherein the second input and the third input indicate a same motion, the second control signal indicates a motion in a first direction, and the first control signal indicates a combination of the motion in the first direction and a motion in a second direction.

10. The storage medium of claim 7, wherein the first control signal is configured to enable the UAV to maintain the reference heading direction after moving the UAV.

11. An unmanned aerial vehicle (UAV), comprising:
a housing;
an omni-directional camera mounted in the housing;
a wireless communication circuit configured to establish wireless communication with a controller;
a plurality of propellers;
a navigation circuit configured to drive the propellers;
a processor disposed in the housing and electrically connected with the omni-directional camera, the wireless communication circuit, and the navigation circuit; and
a memory disposed in the housing and electrically connected with the processor,
wherein the memory stores instructions, which when executed, enable the processor to:
establish wireless communication with the controller using the wireless communication circuit,
transmit video data captured by the omni-directional camera through the wireless communication circuit to the controller while the UAV faces in a first direction,
receive a control signal indicating a second direction different from the first direction through the wireless communication circuit,
control the navigation circuit to cause the UAV to fly without rotation in the second direction, and
transmit the video data captured by the omni-directional camera through the wireless communication circuit to the controller while the UAV faces in the second direction.

12. An unmanned aerial vehicle (UAV), comprising:
a camera module;
a wireless communication circuit configured to transmit or receive data;
a plurality of propellers;
a processor; and
a memory electrically connected with the processor,
wherein the memory stores instructions, which when executed, enable the processor to:
transmit a video captured by the UAV to a controller while the UAV faces in a reference heading direction,
receive a first control signal indicating a motion in a first direction with respect to a virtual heading direction from the controller,
identify a second direction with respect to the reference heading direction corresponding to the first direction with respect to the virtual heading direction,
convert the first control signal into a control signal indicating a motion in the second direction with respect to the reference heading direction to cause the UAV to move in the first direction with respect to the virtual heading direction, and
move the UAV according to the converted control signal.

13. The UAV of claim 12, wherein the memory further stores instructions to enable the processor to receive a second control signal to cause the UAV to move with respect to the reference heading direction of the UAV from the controller and move the UAV according to the second control signal.

14. The UAV of claim 12, wherein the first control signal indicates pitch rotation, and the converted control signal indicates a combination of pitch rotation and roll rotation.

15. The UAV of claim 12, wherein the converted control signal is configured to enable the UAV to maintain the reference heading direction after moving the UAV.

16. A storage medium storing commands, the commands configured to be executed by at least one processor to enable the at least one processor to perform at least one operation, the at least one operation comprising:
- transmitting a video captured by an unmanned aerial vehicle (UAV) to a controller while the UAV faces in a reference heading direction;
- receiving a first control signal indicating a motion in a first direction with respect to a virtual heading direction from the controller;
- identifying a second direction with respect to the reference heading direction corresponding to the first direction with respect to the virtual heading direction,
- converting the first control signal into a control signal indicating a motion in the second direction with respect to the reference heading direction to cause the UAV to move in the first direction with respect to the virtual heading direction; and
- moving the UAV according to the converted control signal.

17. The storage medium of claim 16, wherein the at least one operation further comprises:
- receiving a second control signal to cause the UAV to move with respect to the reference heading direction of the UAV from the controller; and
- moving the UAV according to the second control signal.

18. The storage medium of claim 16, wherein the converted control signal is configured to enable the UAV to maintain the reference heading direction after moving the UAV.

* * * * *